(12) United States Patent
Hori et al.

(10) Patent No.: US 10,971,149 B2
(45) Date of Patent: Apr. 6, 2021

(54) VOICE INTERACTION SYSTEM FOR INTERACTION WITH A USER BY VOICE, VOICE INTERACTION METHOD, AND PROGRAM

(71) Applicant: TOYOTA JIDOSHA KABUSHIKI KAISHA, Toyota (JP)

(72) Inventors: Tatsuro Hori, Miyoshi (JP); Narimasa Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 16/360,238

(22) Filed: Mar. 21, 2019

(65) Prior Publication Data
US 2019/0348038 A1    Nov. 14, 2019

(30) Foreign Application Priority Data

May 11, 2018   (JP) .............................. JP2018-092139

(51) Int. Cl.
*G10L 15/22*  (2006.01)
*G06N 20/00*  (2019.01)
(Continued)

(52) U.S. Cl.
CPC .............. *G10L 15/22* (2013.01); *G06F 3/167* (2013.01); *G06F 40/56* (2020.01); *G06N 20/00* (2019.01);
(Continued)

(58) Field of Classification Search
CPC ........................................................ G10L 15/22
See application file for complete search history.

(56) References Cited

U.S. PATENT DOCUMENTS

2004/0056907 A1*  3/2004  Sharma .............. G06K 9/00335
                                                                  715/863
2012/0078622 A1*  3/2012  Iwata ...................... G10L 15/22
                                                                  704/231
(Continued)

FOREIGN PATENT DOCUMENTS

JP    2005-352154        12/2005
JP    2007-72331 A       3/2007
(Continued)

*Primary Examiner* — Jialong He
(74) *Attorney, Agent, or Firm* — Oblon, McClelland, Maier & Neustadt, L.L.P.

(57) ABSTRACT

A voice interaction system capable of appropriately handling a situation to effectively prevent a response error from occurring. A speech acquisition unit 102 acquires user speech. A feature extraction unit 104 extracts a feature of the acquired user speech. A response determination unit 120 determines a response corresponding to the extracted feature using any one of a plurality of learning models. A response execution unit 130 performs control in order to execute the determined response. A response error determination unit 140 determines whether the executed response is an error. A learning model selection unit 150 selects the learning model from the plurality of learning models stored in a learning model database 160 according to a result of the determination by the response error determination unit 140. The response determination unit 120 determines the response using the selected learning model.

7 Claims, 22 Drawing Sheets

(51) Int. Cl.
  *G06F 3/16*     (2006.01)
  *G06F 40/56*    (2020.01)
(52) U.S. Cl.
  CPC .. *G10L 2015/223* (2013.01); *G10L 2015/225* (2013.01)

(56) References Cited

U.S. PATENT DOCUMENTS

2018/0090144 A1* 3/2018 Ikeno ................. G10L 15/1815
2018/0122377 A1* 5/2018 Skantze ................. G10L 25/48

FOREIGN PATENT DOCUMENTS

| | | |
|---|---|---|
| JP | 2009-3040 A | 1/2009 |
| JP | 2009-300573 | 12/2009 |
| JP | 2015-087718 | 5/2015 |
| JP | 2017-102247 | 6/2017 |
| JP | 2017-125921 | 7/2017 |

* cited by examiner

FEATURE VECTOR $v_i = (v_{i1}, v_{i2}, v_{i3}, v_{i4}, v_{i5}, v_{i6}, v_{i7}, \cdots, v_{im}, \cdots)$
$= (f0_{T1}, V_{T1}, f0_{T2}, V_{T2}, f0, V, L1, \cdots, 1, \cdots)$

| INFORMATION TYPE | ELEMENT | | COMPONENT VALUE | COMPONENT |
|---|---|---|---|---|
| i-th USER SPEECH INFORMATION | PHRASE END T1 msec | f0 | $f0_{T1}$ | $v_{i1}$ |
| | | VOLUME | $V_{T1}$ | $v_{i2}$ |
| | PHRASE END T2 msec | f0 | $f0_{T2}$ | $v_{i3}$ |
| | | VOLUME | $V_{T2}$ | $v_{i4}$ |
| | WHOLE SPEECH SECTION | f0 | f0 | $v_{i5}$ |
| | | VOLUME | V | $v_{i6}$ |
| | USER SPEECH LENGTH | | L1 | $v_{i7}$ |
| | .... | | ... | ... |
| HISTORY OF SYSTEM RESPONSES | TYPE OF IMMEDIATELY-PRECEDING RESPONSE | | 1 | $v_{im}$ |
| | .... | | ... | ... |

TYPE OF IMMEDIATELY-PRECEDING RESPONSE:
1:SILENT, 2:NOD, 3:SPEAK

Fig. 3

| USER UTTERANCE | FEATURE VECTOR | | | | | | CORRECT LABEL |
|---|---|---|---|---|---|---|---|
| | PHRASE END T1 msec | | PHRASE END T2 msec | | USER SPEECH LENGTH (sec) | ... | |
| | f0 | VOLUME | f0 | VOLUME | | | |
| "AFTER ALL" | ... | ... | ... | ... | 0.5 | ... | A  SILENT |
| "I LISTENED TO IT BY MYSELF" | ... | ... | ... | ... | 1.5 | ... | C  SPEAK |

Fig. 5

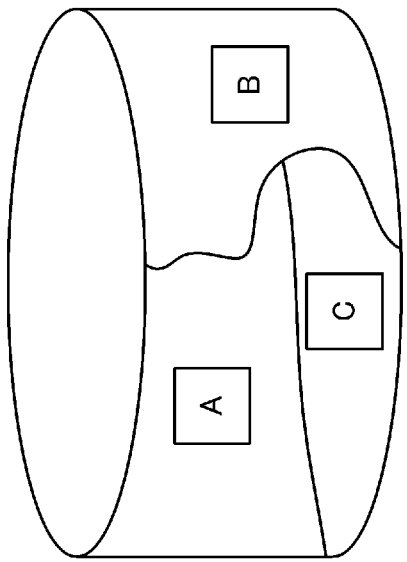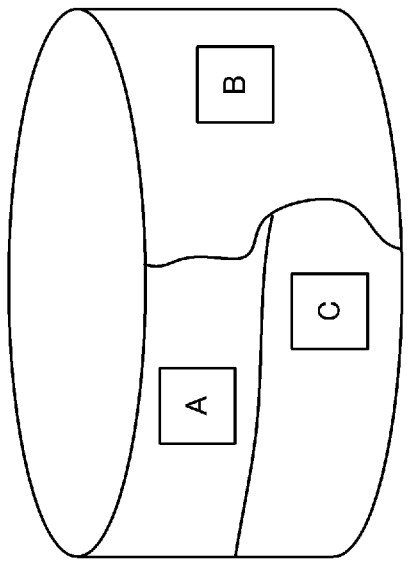
Fig. 6

| USER | FEATURE VECTOR | CORRECT LABEL |
|---|---|---|
| A | ... | A |
| A | ... | C |
| A | ... | A |
| B | ... | B |
| B | ... | ... |
| ... | ... | ... |
| ... | ... | A |
| Z | ... | C |
| Z | ... | B |
| Z | ... | C |

Fig. 17

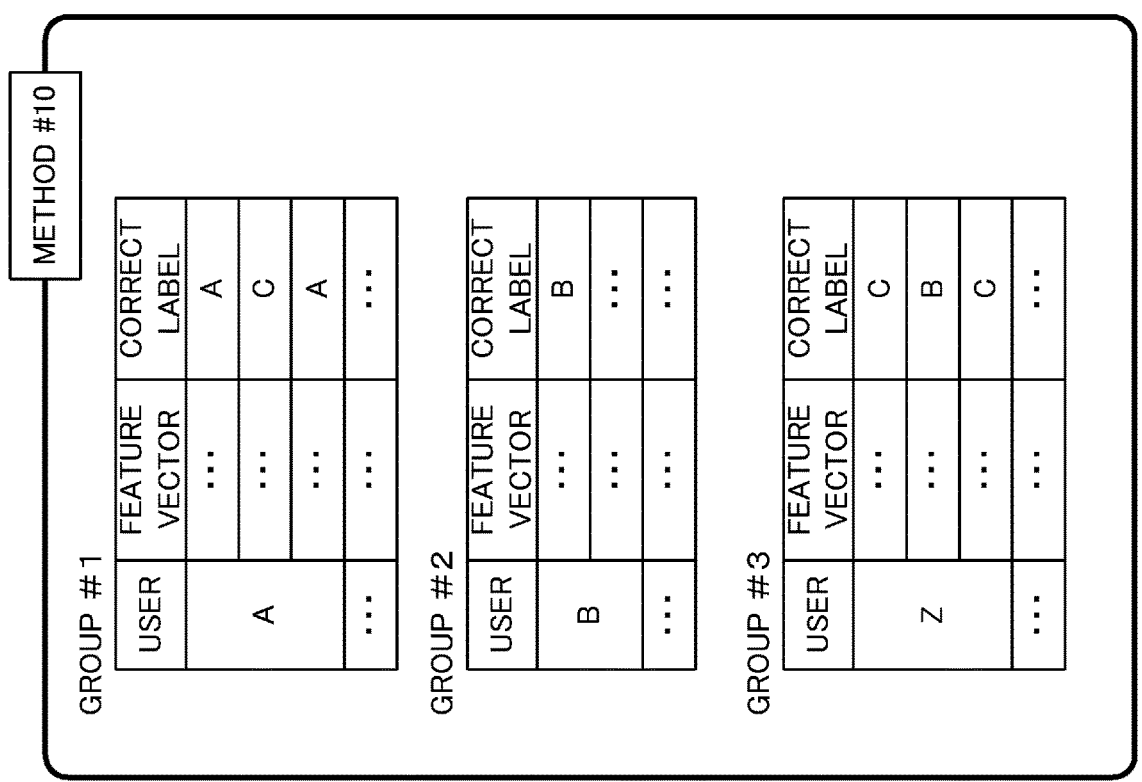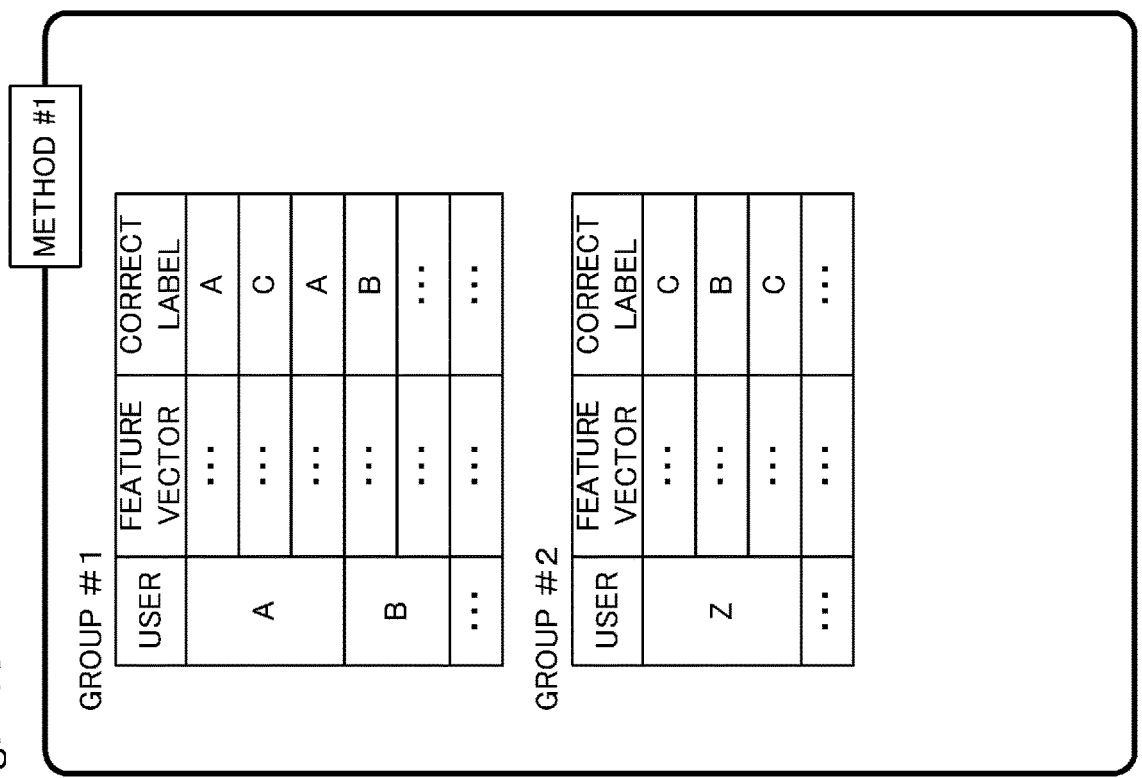
Fig. 18

| USER UTTERANCE | FEATURE VECTOR | | | | | | CORRECT LABEL |
|---|---|---|---|---|---|---|---|
| | PHRASE END T1 msec | | PHRASE END T2 msec | | USER SPEECH LENGTH (sec) | ... | |
| | f0 | VOLUME | f0 | VOLUME | | | |
| "AFTER ALL" | ... | ... | ... | ... | 0.5 | ... | C SPEAK |
| "I LISTENED TO IT BY MYSELF" | ... | ... | ... | ... | 1.5 | ... | C SPEAK |

Fig. 22

| USER UTTERANCE | FEATURE VECTOR | | | | | | CORRECT LABEL |
|---|---|---|---|---|---|---|---|
| | PHRASE END T1 msec | | PHRASE END T2 msec | | USER SPEECH LENGTH (sec) | ... | |
| | f0 | VOLUME | f0 | VOLUME | | | |
| "AFTER ALL" | ... | ... | ... | ... | 0.5 | ... | not C |
| "I LISTENED TO IT BY MYSELF" | ... | ... | ... | ... | 1.5 | ... | C  SPEAK |

Fig. 23

VOICE INTERACTION SYSTEM FOR INTERACTION WITH A USER BY VOICE, VOICE INTERACTION METHOD, AND PROGRAM

CROSS REFERENCE TO RELATED APPLICATIONS

This application is based upon and claims the benefit of priority from Japanese patent application No. 2018-092139, filed on May 11, 2018, the disclosure of which is incorporated herein in its entirety by reference.

BACKGROUND

The present disclosure relates to a voice interaction system, a voice interaction method, and a program and in particular to a voice interaction system, a voice interaction method, and a program for having a conversation with a user by using a voice.

A technique for enabling a user to enjoy a daily conversation with a voice interaction apparatus such as a voice interaction robot (voice interaction system) is becoming widespread. A voice interaction robot according to this technique analyzes phonological information of a voice uttered by a user and executes a response according to a result of the analysis. Here, the voice interaction robot determines a response using a learning model.

Regarding the above technique, Japanese Unexamined Patent Application Publication No. 2005-352154 discloses an emotional state reaction operation apparatus which evaluates an emotional state of a user from a voice uttered by the user and executes an appropriate corresponding operation. The emotional state reaction operation apparatus according to Japanese Unexamined Patent Application Publication No. 2005-352154 includes phoneme feature quantity extraction means for extracting a feature quantity related to a phoneme spectrum of voice information, state determination means for determining an emotional state of the voice information based on a state determination table prepared in advance, and corresponding action selection means for inputting the emotional state and determining a corresponding action process based on a corresponding action selection table prepared in advance. The emotional state reaction motion apparatus according to Japanese Unexamined Patent Application Publication No. 2005-352154 further includes an emotional state learning table and emotional state learning means. The emotional state learning means acquires a relation between the phoneme feature quantity and the emotional state using a predetermined machine learning model based on the emotional state learning table and stores a result of the learning in the state determination table. The state determination means determines an emotional state according to the machine learning model based on the state determination table.

SUMMARY

The machine learning model may not be appropriate depending on a state of a user (a difference in the user, an emotion of the user, etc.). In this case, for example, a response error such as a speech collision between user speech and apparatus speech, or a long silence in which a period between user speech and apparatus speech is long may occur. To address this issue, the technique according to Japanese Unexamined Patent Application Publication No. 2005-352154 determines the corresponding action process using one machine learning model. For this reason, with the technique according to Japanese Unexamined Patent Application Publication No. 2005-352154, it is difficult to appropriately handle a situation to effectively prevent a response error caused by an inappropriate learning model from occurring.

The present disclosure provides a voice interaction system, a voice interaction method, and a program capable of appropriately handling a situation so as to effectively prevent a response error from occurring.

An example aspect of the present disclosure is a voice interaction system configured to have a conversation with a user by using a voice, including: a speech acquisition unit configured to acquire user speech, the user speech being speech given by the user; a feature extraction unit configured to extract a feature of the acquired user speech; a response determination unit configured to determine a response corresponding to the extracted feature using any one of a plurality of learning models generated in advance by machine learning; a response execution unit configured to perform control in order to execute the determined response; a response error determination unit configured to determine whether the executed response is an error according to a timing of the executed response to the user speech or a timing of the user speech for the executed response; and a learning model selection unit configured to select the learning model from the plurality of learning models according to a result of the determination by the response error determination unit. The response determination unit determines the response using the learning model selected by the learning model selection unit.

Another example aspect of the present disclosure is a voice interaction method performed by a voice interaction system that has a conversation with a user by using a voice. The voice interaction method includes: acquiring user speech given by the user; extracting a feature of the acquired user speech; determining a response corresponding to the extracted feature using any one of a plurality of learning models generated in advance by machine learning; performing control in order to execute the determined response; determining whether the executed response is an error according to a timing of the executed response to the user speech or a timing of the user speech for the executed response; and selecting the learning model from the plurality of learning models according to a result of the determination. The response determination unit determines the response using the learning model selected by the learning model selection unit.

Another example aspect of the present disclosure is a program for executing a voice interaction method performed by a voice interaction system that has a conversation with a user by using a voice, the program causing a computer to execute: acquiring user speech given by the user; extracting a feature of the acquired user speech; determining a response corresponding to the extracted feature using any one of a plurality of learning models generated in advance by machine learning; performing control in order to execute the determined response; determining whether the executed response is an error according to a timing of the executed response to the user speech or a timing of the user speech for the executed response; and selecting the learning model from the plurality of learning models according to a result of the determination. The response determination unit determines the response using the learning model selected by the learning model selection unit.

The cause for generating a response error is often an inappropriate learning model. The above-described configuration of the present disclosure makes it possible to switch the learning model for determining a response to an appropriate one when a response error occurs. Therefore, the present disclosure can appropriately handle a situation so as to effectively prevent a response error from occurring.

Preferably, the learning model selection unit selects the learning model having a high probability of not selecting a response determined to be the error when the feature corresponding to the response determined to be the error is input.

The above-described configuration of the present disclosure makes it possible to select a learning model that can further improve the accuracy of a response.

Preferably, when the response is determined to be the error more than or equal to a predetermined plurality of times within a predetermined first period, the learning model selection unit selects the learning model having a high probability of not selecting the response determined to be the error when the feature corresponding to the response determined to be the error is input.

The above-described configuration of the present disclosure is configured to select a new learning model using a plurality of feature vectors of the user speech which induced a response error. When the learning model is evaluated using a plurality of feature vectors in this way, it is possible to further improve the accuracy of the learning model to be selected.

Preferably, when a speech response is executed by the response execution unit during the user speech or when the user speech is executed while the response execution unit is executing the speech response, the response error determination unit determines that the response is an error of a speech collision, and the learning model selection unit selects the learning model having a high probability of not outputting the speech response when the feature corresponding to the response when the response is determined to be the error of the speech collision is input.

The above-described configuration of the present disclosure makes it possible to reselect, when the response error of the speech collision occurs, the learning model which will not output the speech response for the feature vector of the user speech which induced the speech collision. By doing so, the present disclosure can effectively prevent a speech collision from occurring.

Preferably, when a period from an end of the user speech until execution of the speech response by the response execution unit is longer than or equal to a predetermined second period, the response error determination unit determines the response as an error of a long silence, and the learning model selection unit selects the learning model having a high probability of outputting the speech response when the feature corresponding to the response when the response is determined to be the error of the long silence is input.

The above-described configuration of the present disclosure makes it possible to reselect, when the response error of the long silence occurs, the learning model which will output the speech response for the feature vector of the user speech which induced the long silence. By doing so, the present disclosure can effectively prevent a long silence from occurring.

Preferably, the voice interaction system further includes a learning model generation unit configured to generate a plurality of learning models. The learning model generation unit classifies a sample data group used for the generating the learning model by a plurality of classification methods, calculates accuracy of each of the plurality of classification methods by calculating accuracy of the learning model obtained by performing machine learning for each of a plurality of groups obtained after the sample data group is classified, and generates the plurality of learning models using each of the plurality of groups classified by a classification method having the highest accuracy.

The above-described configuration of the present disclosure makes it possible to generate the plurality of learning models with high accuracy. Therefore, when the learning model is reselected, it is possible to have a conversation with improved response accuracy.

Preferably, the voice interaction system further includes a data acquisition unit configured to acquire sample data for generating the learning model. When the data acquisition unit acquires the sample data, the speech acquisition unit acquires the user speech for acquiring the sample data, the feature extraction unit extracts the feature of the acquired user speech, the response determination unit determines the response according to the extracted feature using a determination model generated in advance by machine learning, the response execution unit performs control for executing the determined response, the response error determination unit determines whether the executed response to the user speech for acquiring the sample data is the error, and when the executed response to the user speech for acquiring the sample data is the error, the data acquisition unit acquires the sample data by giving an incorrect label to the feature corresponding to the user speech.

The above-described configuration of the present disclosure makes it possible to efficiently generate a learning model.

According to the present disclosure, it is possible to provide a voice interaction system, a voice interaction method, and a program capable of appropriately handling a situation to effectively prevent a response error from occurring.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 shows an example of a feature vector generated by a feature extraction unit according to the first embodiment;

FIG. 5 is a diagram for explaining the learning model generation method according to the first embodiment;

FIG. 6 is a diagram for explaining the learning model generation method according to the first embodiment;

FIG. 17 shows an example of sample data groups;

FIG. 18 is a diagram showing an example in which sample data is classified;

FIG. 22 shows an example of the sample data used in generation of a learning model according to the third embodiment; and FIG. 23 shows an example of the sample data used in the generation of the learning model according to the third embodiment.

DESCRIPTION OF EMBODIMENTS

First Embodiment

Hereinafter, embodiments according to the present disclosure are explained with reference to the drawings. Note that the same symbols are assigned to the same components throughout the drawings, and repeated explanations are omitted as required.

Figure 1:
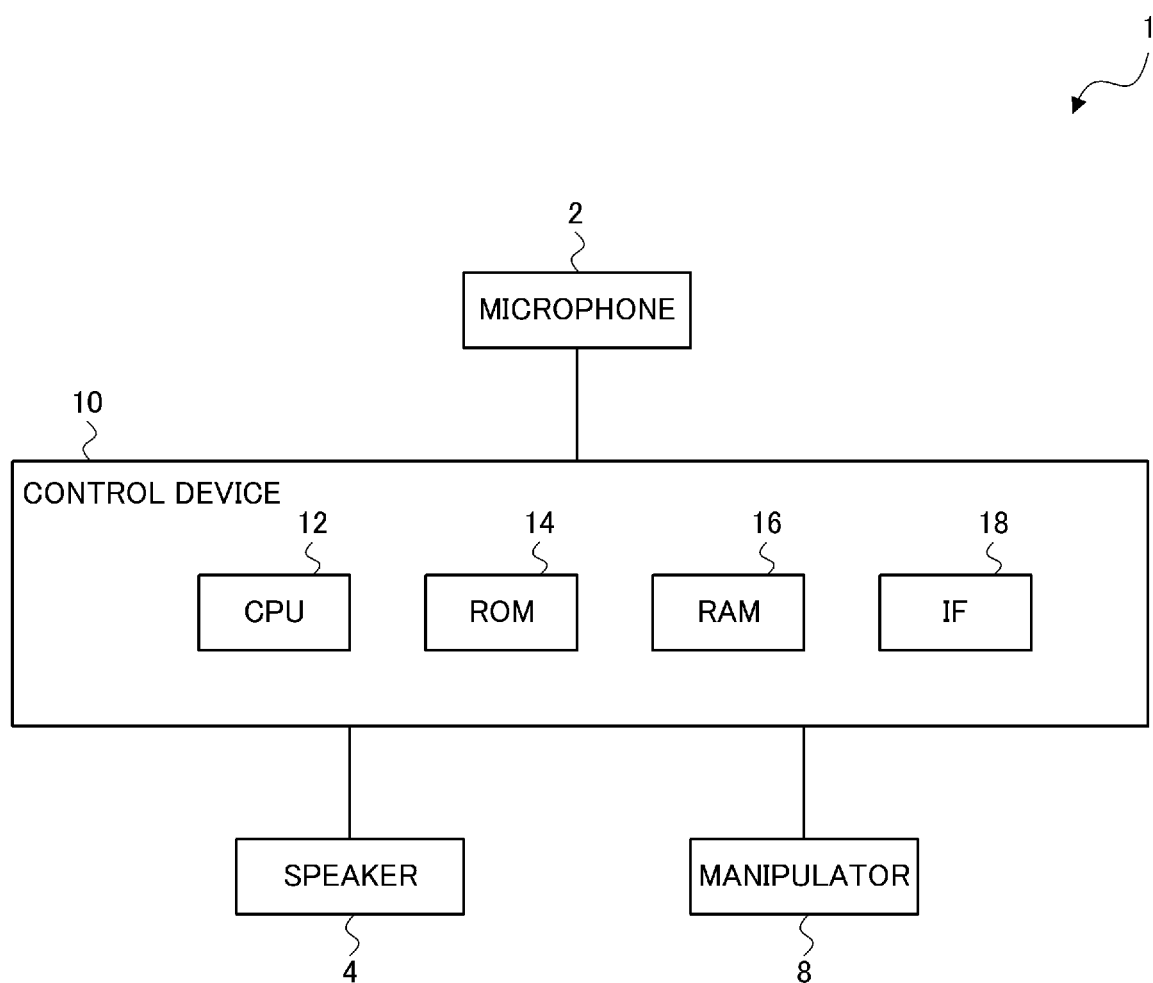
FIG. 1 shows a hardware configuration of a voice interaction system according to a first embodiment.

FIG. 1 shows a hardware configuration of a voice interaction system 1 according to a first embodiment. The voice interaction system 1 performs a conversation with a user by using a voice. Specifically, the voice interaction system 1 performs a conversation with a user by executing a response such as a voice for the user according to speech given by the user (i.e., according to user speech). The voice interaction system 1 can be installed in, for example, a robot such as a livelihood support robot and a compact robot, a cloud system, a smart phone, and so on. An example in which the voice interaction system 1 is installed in a robot is given in the following descriptions.

The voice interaction system 1 includes a microphone 2 that collects surrounding sounds, a speaker 4 that produces a voice, a manipulator 8 that operates a neck and the like of the robot, and a control device 10. Note that the voice interaction system 1 may include an image pickup device such as a camera. The control device 10 has, for example, a function as a computer. The control device 10 is connected to the microphone 2, the speaker 4, and a manipulator 8 wirelessly or through a wire.

The control device 10 includes, as main hardware components, a CPU (Central Processing Unit) 12, a ROM (Read Only Memory) 14, a RAM (Random Access Memory) 16, and an interface (IF) unit 18. The CPU 12, the ROM 14, the RAM 16, and the interface unit 18 are connected to each other through a data bus or the like.

The CPU 12 has a function as an arithmetic unit that performs a control process, an arithmetic process, and the like. The ROM 14 has a function of storing a control program, an arithmetic program, and the like executed by the CPU 12. The RAM 16 has a function of temporarily storing processing data and the like. The interface unit 18 inputs and outputs signals to and from the outside wirelessly or through a wire. Further, the interface unit 18 accepts an operation of inputting data by the user, and displays information for the user.

The control device 10 analyzes user speech collected by the microphone 2, determines a response to the user according to the user speech, and executes it. Here, in this embodiment, the "response" includes "silent", "nod", and "speak". The "silent" is an action in which the voice interaction system 1 does nothing. The "nod" is an action of vertically swinging the neck part of the robot. The "speak" is an action in which the voice interaction system 1 outputs a voice. When the determined response is "nod", the control device 10 controls the manipulator 8 to operate the neck part of the robot. When the determined response is "speak", the control device 10 outputs a voice (system speech) corresponding to the generated response through the speaker 4.

Figure 2:
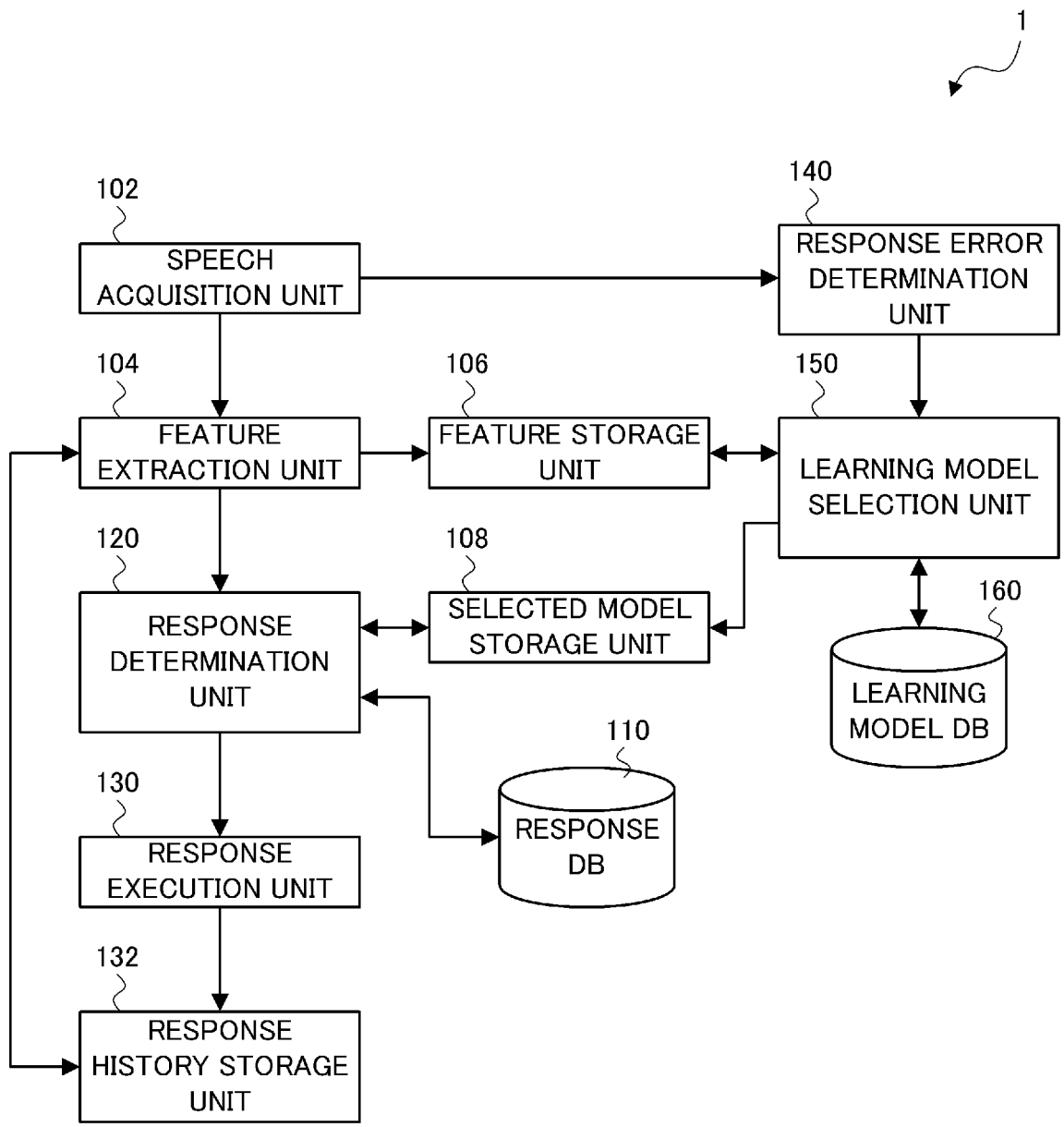
FIG. 2 is a block diagram showing a configuration of the voice interaction system according to the first embodiment.

FIG. 2 is a block diagram showing a configuration of the voice interaction system 1 according to the first embodiment. The voice interaction system 1 according to the first embodiment includes a speech acquisition unit 102, a feature extraction unit 104, a feature storage unit 106, a selected model storage unit 108, a response database 110 (response DB), a response determination unit 120, a response execution unit 130, and a response history storage unit 132. The voice interaction system 1 according to the first embodiment further includes a response error determination unit 140, a learning model selection unit 150, and a learning model database 160 (learning model DB).

Each of the components shown in FIG. 2 can be implemented by at least one of the microphone 2, the speaker 4, a manipulator 8, and the control device 10. Further, at least one of the components can be implemented, for example, by having the CPU 12 execute a program stored in the ROM 14. Further, a necessary program may be stored in an arbitrary nonvolatile recording medium and may be installed as required. Note that the implementation of each component is not limited to software implementation. That is, each component may be implemented by hardware such as some kind of a circuit element. Furthermore, it is not necessary for all of the components shown in FIG. 2 to be included in one device, and instead one or more of the components shown in FIG. 2 may be included in a device that is physically separate from the other components. For example, the learning model database 160 may be included in a server, and components other than the learning model database 160 may be included in a voice interaction robot etc. that can communicate with the server. This also applies to other embodiments, which will be described later.

The speech acquisition unit 102 may include the microphone 2. The speech acquisition unit 102 acquires user speech (and system speech). Specifically, the speech acquisition unit 102 collects user speech (and speech of the voice interaction system 1) and converts it into a digital signal. Then, the speech acquisition unit 102 outputs voice data of the user speech (speech voice data) to the feature extraction unit 104. Further, the speech acquisition unit 102 outputs the user voice data and the voice data (system voice data) of the system speech to the response error determination unit 140.

The feature extraction unit 104 extracts features of the user speech. Specifically, the feature extraction unit 104 analyzes, for the user speech, non-linguistic information, which is different from linguistic information indicating a specific semantic content of the user speech. Further, the feature extraction unit 104 generates a feature vector, which will be described later, as a non-linguistic information analysis result that is a result of analyzing the non-linguistic information. Then, the feature extraction unit 104 outputs the non-linguistic information analysis result (the feature vector) to the response determination unit 120. The feature extraction unit 104 also stores the extracted feature vector in the feature storage unit 106. Every time the speech acquisition unit 102 acquires user speech, a feature vector corresponding to the user speech may be stored in the feature storage unit 106.

Note that the non-linguistic information is information that is different from the linguistic information (the character string) of user speech to be processed and includes at least one of prosodic information (or rhythm information) on the user speech and response history information. The prosodic information is information indicating features of a voice waveform of user speech such as a fundamental frequency, a sound pressure, a variation in frequency or the like, a band of variations, a maximum amplitude, an average amplitude, and so on. Further, the response history information is information indicating a past history of responses determined (generated) by the response determination unit 120 and executed by the response execution unit 130. The response history storage unit 132 stores (updates) this response history information when a response is executed by the response execution unit 130.

Specifically, the feature extraction unit 104 analyzes prosodic information based on the voice waveform by performing a voice analysis or the like for the user voice data acquired by the speech acquisition unit 102. Then, the feature extraction unit 104 calculates a value indicating a feature quantity indicating the prosodic information. Note that the feature extraction unit 104 may calculate, for the user voice data, a fundamental frequency or the like for each of frames that are obtained by dividing the user voice data, for example, at the interval of 32 msec. Further, the feature extraction unit 104 extracts (or reads) response history information from the response history storage unit 132 and calculates a feature quantity indicating a feature of the response history.

Note that since the syntactic analysis using the linguistic information of the user speech uses pattern recognition or the like, it often requires a very long time to do this analysis. In contrast to this, the amount of data used for the analysis of the non-linguistic information (i.e., the analysis of the prosodic information and the analysis of the response history information) is smaller than that for the syntactic analysis and its calculation technique is simpler than that for the syntactic analysis. Therefore, the time required for the analysis of the non-linguistic information may be much shorter than the time required for the syntactic analysis.

The selected model storage unit 108 stores a learning model selected by the learning model selection unit 150, which will be described later. Here, in this embodiment, the learning model selection unit 150 selects an appropriate learning model from a plurality of learning models stored in the learning model database 160 by a method described later. When the learning model selection unit 150 has not selected a learning model, such as before a voice interaction starts, the selected model storage unit 108 may store one specified learning model.

The response database 110 stores data necessary for the voice interaction system 1 to make a response. For example, the response database 110 stores in advance a plurality of system voice data pieces indicating system speech when the response is "speak".

The response determination unit 120 determines which response is to be executed according to the non-linguistic information analysis result (the feature vector). Here, in this embodiment, the response determination unit 120 determines a response according to the extracted feature (the feature vector) using one of the plurality of learning models generated by machine learning in advance such as supervised learning. Details will be described later.

In this embodiment, the response determination unit 120 determines one of "silent", "nod", and "speak" as a response. The response determination unit 120 outputs data (response data) indicating the determined response to the response execution unit 130. When the response determination unit 120 determines to "speak" as a response, it may sequentially or randomly select the system speech (the system voice data) from the plurality of system speech stored in the response database 110. The response determination unit 120 outputs the selected system voice data to the response execution unit 130.

The response execution unit 130 performs control for executing the response determined by the response determination unit 120. Specifically, when the response data output from the response determination unit 120 indicates "silent (silent response)", the response execution unit 130 control the speaker 4 and the manipulator 8 so that they do not operate. When the response data output from the response determination unit 120 indicates "nod (nod response)", the response execution unit 130 controls the manipulator 8 to operate the neck part of the robot. When the response data output from the response determination unit 120 indicates "speak (speech response)", the response execution unit 130 controls the speaker 4 to output a voice indicating the system voice data selected by the response determination unit 120.

The response history storage unit 132 stores data for identifying the response executed by the response execution unit 130 as response history information. Further, when the response history storage unit 132 includes the time related to a conversation as the response history information, the response history storage unit 132 may measure a period of time during which the conversation takes place and store the measured time as the response history information.

FIG. 3 shows an example of a feature vector generated by the feature extraction unit 104 according to the first embodiment. Note that the feature vector shown in FIG. 3 is merely an example. That is, other various feature vectors can be used as the feature vector. Letting $v_i$ represent a feature vector for i-th user speech, n components of the feature vector are expressed as "$v_i = (v_{i1}, v_{i2}, \ldots, v_{i(m-1)}, v_{im}, v_{i(m+1)}, \ldots, v_{in})$". Note that each of i, n and m is an integer (n>m). Further, $v_{i1}$ to $v_{i(m-1)}$ correspond to a result of an analysis of prosodic information related to information on the i-th user speech. Further, $v_{im}$ to $v_{in}$ correspond to a result of an analysis of response history information. Note that $v_{im}$ to $v_{in}$ may be information itself stored in the response history storage unit 132. That is, for the response history information, the feature extraction unit 104 may just extract (or read) response history from the response history storage unit 132 and may not perform any special analysis.

In the example shown in FIG. 3, $v_{i1}$ represents a parameter for a fundamental frequency f0 ($f0_{T1}$) in T1 msec at the end of a phrase (hereinafter referred to as the "phrase end") of the i-th user speech (a period between T1 msec (T milliseconds) before the end of the user speech and the end of the user speech). Further, $v_{i7}$ represents a length L1 [sec] of the i-th user speech (a user speech length). Note that the fundamental frequency f0 may be calculated for each frame by using logic of SWIPE (Saw-tooth Waveform Inspired Pitch Estimation) of SPTK (Speech Signal Processing Toolkit).

Further, $v_{im}$ represents a type of an immediately-preceding response. The type of the immediately-preceding response is a type of an immediately-preceding response executed by the response execution unit 130 (just before the i-th user speech) (and is one of "silent", "nod", and "speak"). Note that for each of component values (feature quantities) of components that are not numerical values such as $v_{im}$, a numerical value is assigned for each type. For example, for $v_{im}$, a component value "1" indicates "silent", a component value "2" indicates "nod", and a component value "3" indicates "speak".

The response error determination unit 140 (FIG. 2) determines whether the executed response is an error according to a timing of the response executed by the response execution unit 130 for the user speech or a timing of the user speech for the response executed by the response execution unit 130. Details will be described later. In the first embodiment, suppose that the case where a "response error" occurs is a case where a "speech collision" or a "long silence" occurs. The "speech collision" means that user speech collides with system speech. An example of the "speech collision" is a case where the response execution unit 130 executes system speech (the speech response) during user speech (before the user speech ends). Another example of the "speech collision" is a case where the user speaks while the speech response is being executed by the response execution unit 130. The "long silence" means that a period from the end of the user speech until execution of a speech response by the response execution unit 130 is longer than or equal to a predetermined period (Ts seconds; a second period). In this way, the response error determination unit 140 can detect that the response executed by the response execution unit 130 has been an error. Thus, the response error determination unit 140 can detect that the current learning model is inappropriate.

The learning model selection unit 150 selects a learning model from the plurality of learning models stored in the learning model database 160 according to the determination result of the response error determination unit 140. Details will be described later. The learning model database 160 stores the plurality of learning models generated in advance by machine learning. A specific example of a method of generating the plurality of learning models will be described later.

The cause for generating a response error is often an inappropriate learning model. For example, an appropriate learning model for a certain user may not be appropriate for another user. Even for the same user, an appropriate learning model may become inappropriate due to changes in the user's emotion etc. The learning model being inappropriate means that the accuracy of the response to the user speech is low. When the accuracy of the response of the learning model is low, the robot executes a "speech response" when a "silent response" should be executed for certain user speech, or the robot executes a "silent response" when a "speech response" should be executed for certain user speech.

On the other hand, in this embodiment, it is possible to switch the learning model for determining a response to an appropriate one when a response error occurs. Thus, the voice interaction system 1 according to this embodiment can appropriately handle a situation to effectively prevent a response error from occurring. That is, the voice interaction system 1 according to this embodiment makes it possible to improve the response accuracy.

Next, an outline of a method of generating the learning model will be described.

Figure 4:
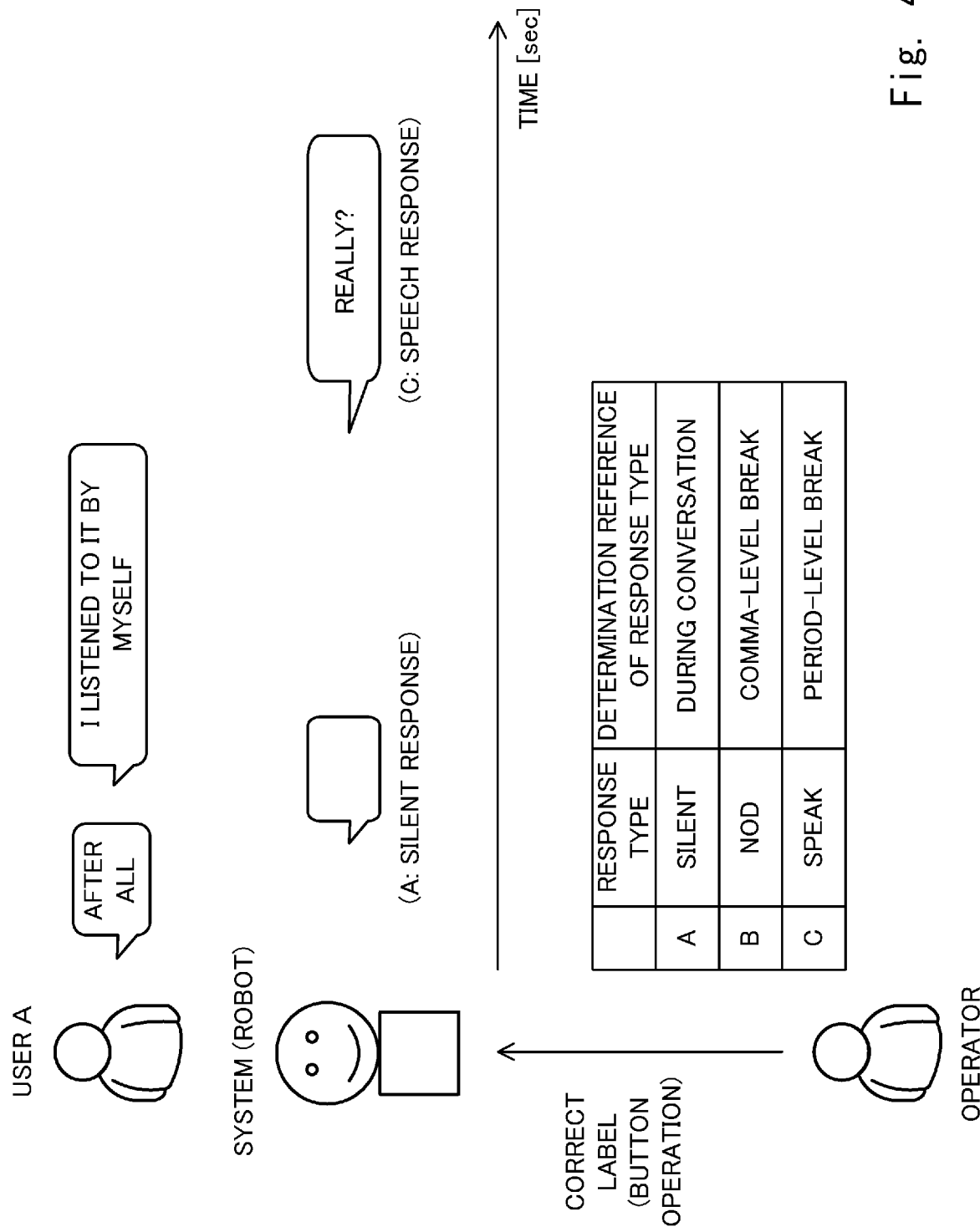
FIG. 4 is a diagram for explaining a learning model generation method according to the first embodiment.

FIGS. 4 to 6 are diagrams for explaining the method of generating the learning model according to the first embodiment. First, sample data for generating the learning model is acquired. As shown in FIG. 4, sample data in which the feature vector and a correct label are associated with each other by a conversation between a user A and the robot, such as the robot (the voice interaction system 1) responding to the user speech, is collected. At this time, an operator operates the robot (the voice interaction system 1) in such a way that the robot executes an appropriate response to speech of the user A.

In the example shown in FIG. 4, a correct label "A" corresponds to the "silent response". A correct label "B" corresponds to a "nod response." A correct label "C" corresponds to a "speech response". The operator operates the robot so that a silent response is executed during the speech of the user A. At this time, the operator does not have to do anything. In addition, the operator operates the robot so that a nod response is executed at a comma-level break in speech of the user A. At this time, the robot nods by the operator's operation. Further, the operator operates the robot so that a speech response is executed at a period-level break of speech of the user A. At this time, the robot speaks by the operator's operation.

In the example of FIG. 4, the operator determines that it is in the middle of the speech of the user A, because there is no break between the speech of the user A "after all" and "I listened to it by myself", and then operates the robot to execute a silent response. When the speech f of the user A "I listened to it by myself" ends, it is determined that there is a period-level break, and the operator operates the robot to execute a speech response. At this time, the robot outputs speech "Really?".

FIG. 5 shows an example of the sample data which is a pair of the feature vector and the correct label acquired from the example of FIG. 4. Since a length of the user speech "after all" is 0.5 seconds, "0.5" is input to a component of the feature vector ($v_{i7}$ in FIG. 3). Further, since the response to the user speech "after all" is the "silent response", the correct label "A" is associated with the feature vector of the user speech "after all".

Moreover, since a length of the user speech "I listened to it by myself" is 1.5 seconds, "1.5" is input to a component of the feature vector ($v_{i7}$ in FIG. 3). Furthermore, since the response to the user speech "I listened to it by myself" is the "speech response", the correct label "C" is associated with the feature vector of the user speech "I listened to it by myself".

Next, a sample data group collected in the manner described above is classified into M groups. The classification method may be carried out by, for example, k-fold Cross Validation. Details will be described later. At this time, the sample data group is classified in such a way that the accuracy with which the response becomes correct is improved. In other words, the sample data group is classified in such a way that a level of matching between the response by the learning model acquired using a group, which is acquired by classifying the sample data group, and the correct label is improved. It is desirable that each classified group includes sample data in such an amount that a sum of the lengths of the user speech becomes 15 minutes or longer.

Then, one learning model is generated by the sample data which is 15 minutes or longer in total.

FIG. 6 shows an example of a mode in which the learning model is generated from the classified sample data group. A learning model #1 is generated from a sample data group of a group #1 by machine learning such as supervised learning. Likewise, a learning model #M is generated by machine learning from a sample data group of a group #M. Since boundaries of the correct labels "A", "B", and "C" of the learning models #1 to #M differ from one another, even when the same feature vector is input to each of the learning models #1 to #M, the response to be output may be different. The plurality of learning models thus generated are stored in the learning model database 160.

Figure 7:
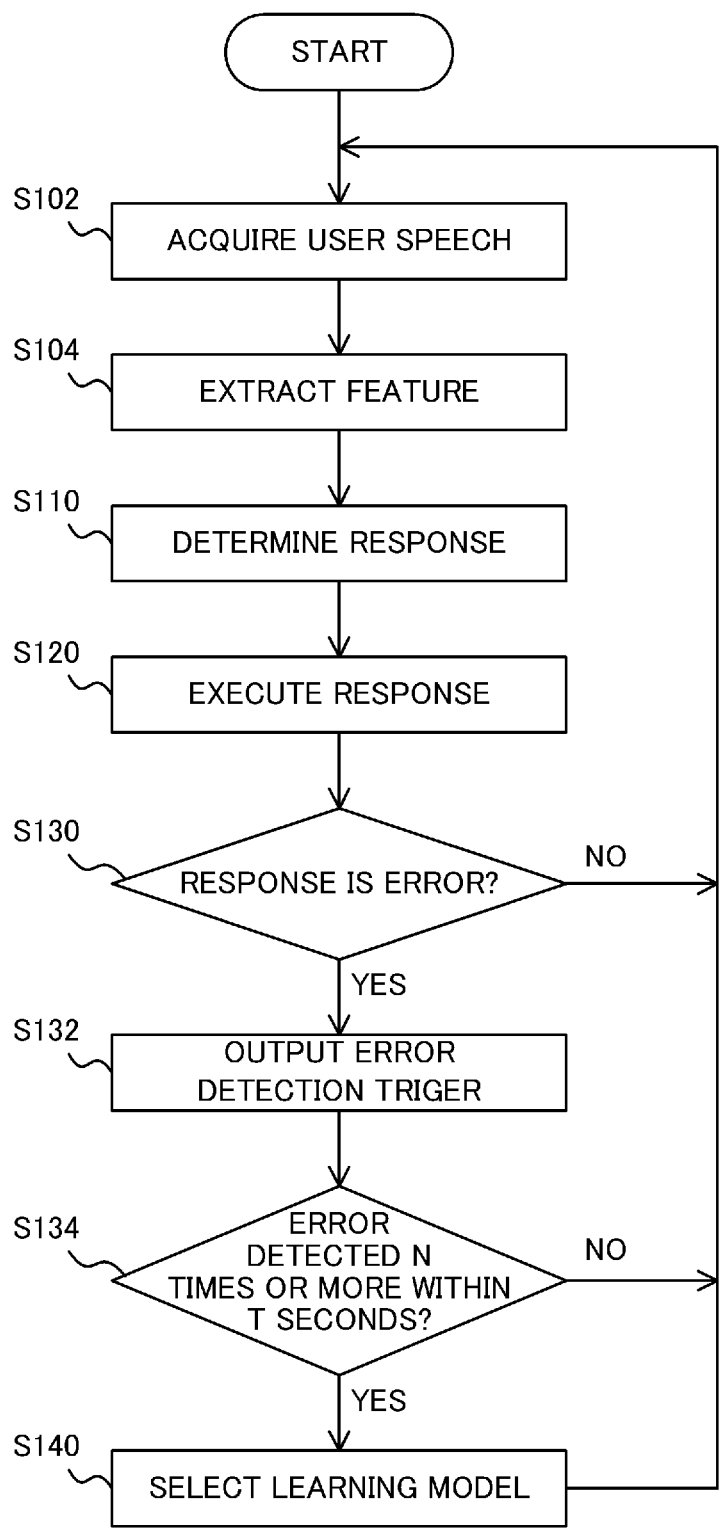
FIG. 7 is a flowchart showing a voice interaction method performed by the voice interaction system according to first embodiment.
Figure 8:
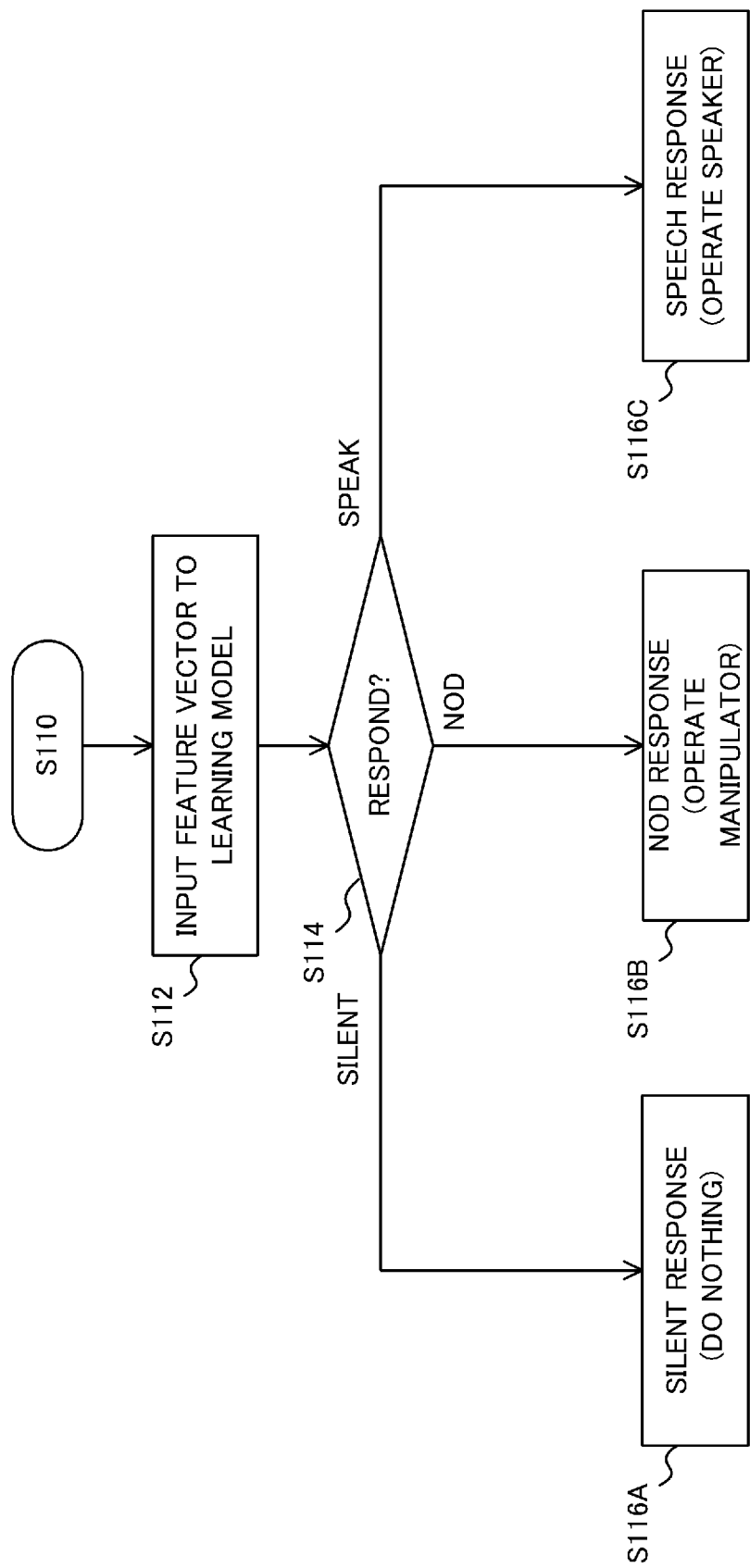
FIG. 8 is a flowchart showing the voice interaction method performed by the voice interaction system according to the first embodiment.

FIGS. 7 and 8 are flowcharts showing a voice interaction method performed by the voice interaction system 1 according to the first embodiment. First, the speech acquisition unit 102 acquires user speech as described above (Step S102). As described above, the feature extraction unit 104 analyzes the non-linguistic information (the prosodic information and response history information) about the acquired user speech and extracts a feature (a feature vector) of the user speech (Step S104).

Next, the response determination unit 120 determines a response to the user speech according to the extracted feature vector using the current learning model (the learning model stored in the selected model storage unit 108) (Step S110). The response execution unit 130 executes the response determined in S110 as described above (Step S120).

FIG. 8 is a flowchart showing the process of S110. The response determination unit 120 inputs the extracted feature vector to the learning model (Step S112). The response determination unit 120 determines the output of the learning model (Step S114).

When the output is the "silent response" ("silent" in S114), the response determination unit 120 determines to execute the silent response (Step S116A). That is, the response determination unit 120 determines not to do anything for the user speech corresponding to this feature vector. When the output is the "nod response" ("nod" in S114), the response determination unit 120 determines to execute the nod response (Step S116B). That is, the response determination unit 120 determines to operate the manipulator 8 in such a way that the neck part of the robot is swung vertically for the user speech corresponding to this feature vector. When the output is the "speech response" ("speak" in S114), the response determination unit 120 determines to execute speech response (Step S116 C). That is, the response determination unit 120 determines to operate the speaker 4 to output the system speech for the user speech corresponding to this feature vector.

Next, as described above, the response error determination unit 140 determines whether the response has been an error (Step S130). When the response error determination unit 140 determines that the response has not been an error (NO in S130), the process returns to S102. On the other hand, when the response error determination unit 140 determines that the response has been an error (YES in S130), it outputs an error detection trigger indicating that a response error has been detected to the learning model selection unit 150 (Step S132). The error detection trigger here may include data indicating the feature vector corresponding to the response that has been an error, and indicating which response error ("speech collision" or "long silence") has occurred. A "feature vector corresponding to a response that has been an error" is a feature vector input to the learning model when a response determined to be an error is output from the learning model.

The learning model selection unit 150 determines whether an error have been detected N times or more within T seconds (Step S134). That is, the learning model selection unit 150 determines whether the response is determined to be an error more than or equal to a predetermined number of times within a predetermined period (a first period). Specifically, the learning model selection unit 150 determines whether the error detection trigger indicating an occurrence of the same type of response errors has been output N times or more within T seconds. If the error has not been detected N times or more within T seconds (NO in S134), the process returns to S102. On the other hand, if the error has been detected N times or more within T seconds (YES in S134), the learning model selection unit 150 selects a learning model from the plurality of learning models stored in the learning model database 160 (Step S140).

At this time, when the learning model selection unit 150 inputs the feature vector corresponding to the response determined to be a response error, it selects the learning model with a high probability of not selecting a response determined to be the response error. For example, when the learning model selection unit 150 inputs the feature vector corresponding to a response determined to be a "speech collision", it selects the learning model having a high probability of not outputting a speech response. When the learning model selection unit 150 inputs the feature vector corresponding to a response determined to be a "long silence", it selects the learning model having a high probability of not outputting a silent response or a nod response (i.e., a speech response is output). As described above, the learning model selection unit 150 according to the first embodiment is configured to select a new learning model using the feature vector corresponding to the response determined to be a response error. This makes it possible to select a learning model that can further improve the accuracy of a response.

When the learning model selection unit 150 inputs the feature vector (N or more feature vectors) corresponding to the response error which has occurred N times or more within T seconds, it selects a learning model with a high probability of not selecting a speech response. Here, the learning model selection unit 150 is configured to select, when N is plural, a new learning model using a plurality of feature vectors of the user speech which induced the response error. When the learning model is evaluated using a plurality of feature vectors in this way, it is possible to further improve the accuracy of the learning model to be selected.

Hereinafter, a case where the response error is the "speech collision" and the case where the response error is the "long silence" will be further described in detail. That is, a case where the "speech collision" occurs N times or more within T seconds and a case where the "long silence" occurs N times or more within T seconds will be described.

Figure 9:
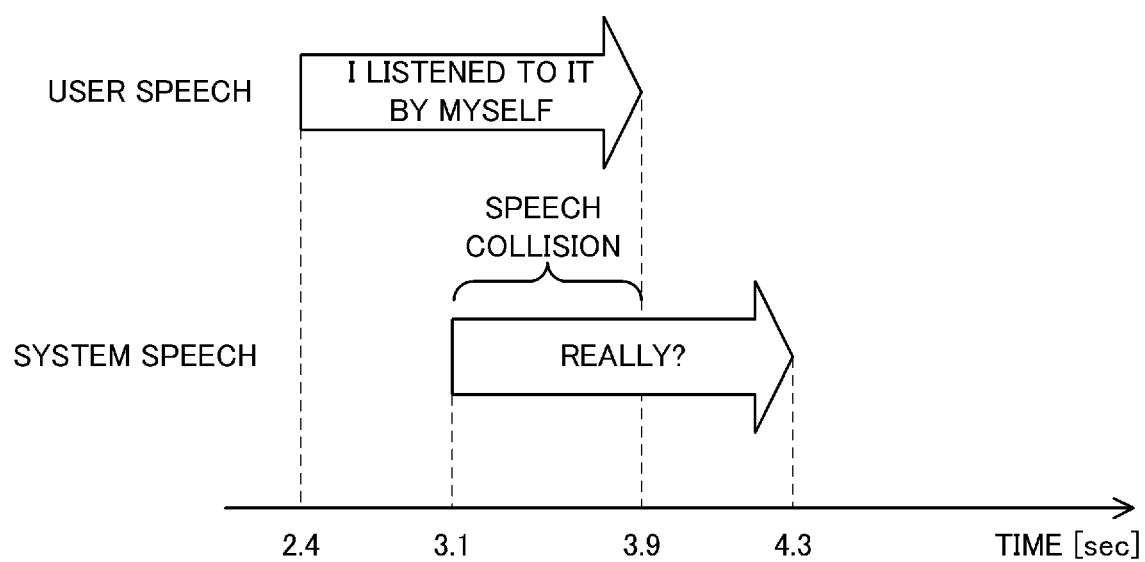
FIG. 9 shows an example of a speech collision.
Figure 10:
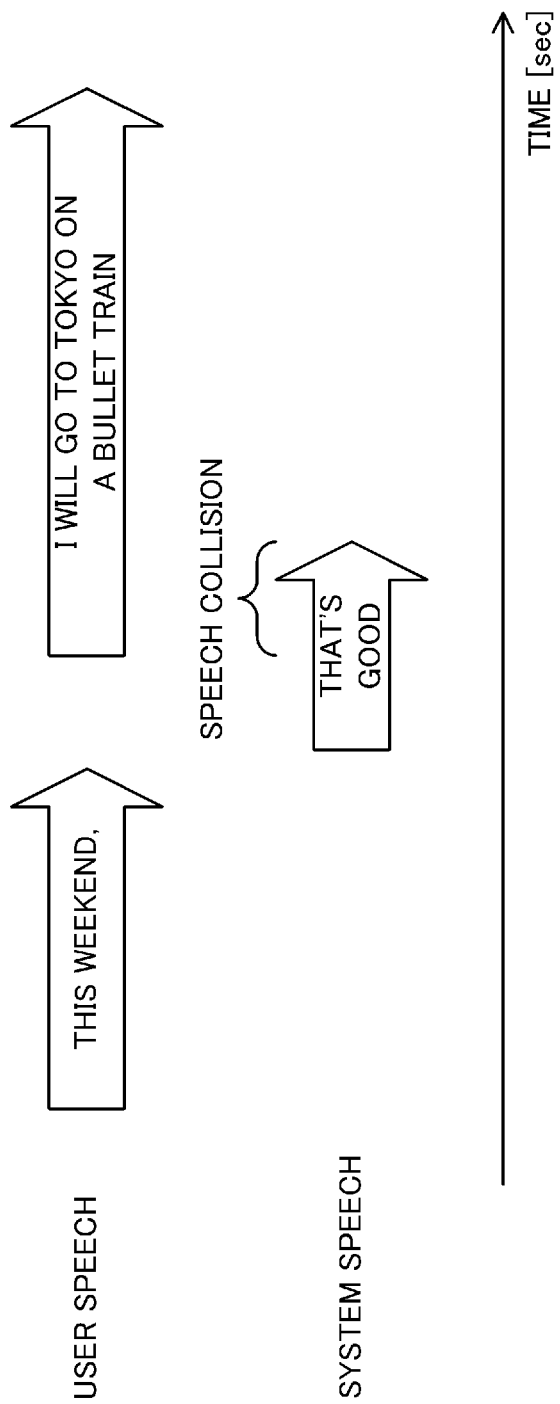
FIG. 10 shows an example of the speech collision.
Figure 11:
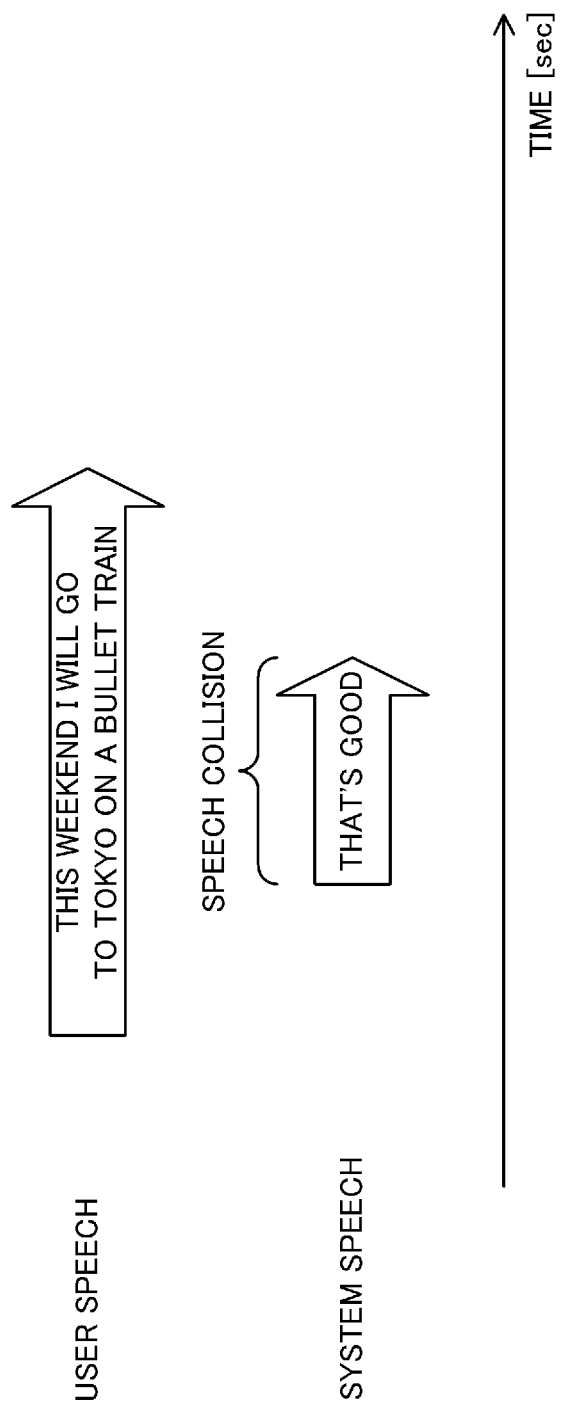
FIG. 11 shows an example of the speech collision.

FIGS. 9 to 11 show examples of the speech collision. In the example shown in FIG. 9, the user speech "I listened it to by myself" starts 2.4 seconds after a conversation has started and ends 3.9 seconds after the conversation has started. Further, the system speech "Really?" starts 3.1 seconds after the conversation has started and ends 4.3 seconds after the conversation has started. In this case, since the system speech "Really?" has started before the user speech "I listened to it by myself" ends, the response error determination unit 140 detects a "speech collision".

In the example of FIG. 10, after the user speech "this weekend,", the user speech "I will go to Tokyo on a Bullet train" follows, and the system speech "that's good" is executed as a response to the user speech "this weekend,". In this example, the user speech "I will go to Tokyo on a Bullet train" has started before the system speech "that's good" ends. Thus, the response error determination unit 140 detects a "speech collision". This speech collision is caused by the fact that the voice interaction system 1 has not been able to determine that the user speech continues after the user speech "this weekend," without a period-level break.

In the example shown in FIG. 11, the system speech "that's good" is executed during the user speech "this weekend I will go to Tokyo on a Bullet train". In this example, the system speech "that's good" has started before the user speech "this weekend I will go to Tokyo on a Bullet train" ends, and thus the response error determination unit 140 detects a "speech collision".

Figure 12:
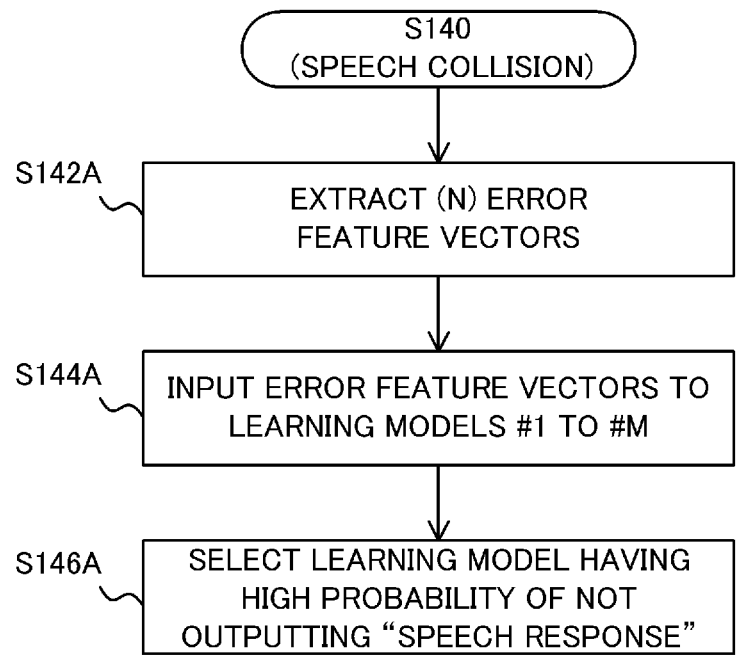
FIG. 12 is a flowchart showing processes performed by a learning model selection unit when the speech collision occurs.

FIG. 12 is a flowchart showing processes (S140) of the learning model selection unit 150 when the speech collision occurs. First, the learning model selection unit 150 extracts, from the feature storage unit 106, the feature vector (an error feature vector) corresponding to the response when a response error has occurred (Step S142A). In this case, at least N error feature vectors can be extracted. For example, in the example shown in FIG. 9, since the response determination unit 120 has determined to execute the speech response when the feature extraction unit 104 extracts the feature vector of a part of the user speech "by myself", the feature vector of the user speech "by myself" is extracted. In the example shown in FIG. 10, the feature vector of the user speech "this weekend," is extracted. In the example shown in FIG. 11, since the response determination unit 120 has determined to execute the speech response when the feature extraction unit 104 extracts the feature vector of a part of the user speech "this weekend", the feature vector of the user speech "this weekend" is extracted.

Next, the learning model selection unit 150 inputs the error feature vectors extracted in the process of S142A to each of the learning models #1 to #M stored in the learning model database 160 (Step S144A). Then, the learning model selection unit 150 selects a learning model having a high probability of not outputting the "speech response" (Step S146A). That is, the learning model selection unit 150 selects a learning model having a high probability of outputting the "silent response" or the "nod response".

For example, let N=3 and M=3. Then, suppose that a speech collision occurs when the learning model #1 is used. In this case, the number of times the learning model #1 outputs the "speech response" when three error feature vectors are input to the learning model #1 is three. In this case, the probability of not outputting the "speech response" is 0/3. Further, suppose that the number of times the learning model #2 outputs the "speech response" when three error feature vectors are input to the learning model #2 is two. In this case, the probability of not outputting the "speech response" is 1/3. Furthermore, suppose that the number of times the learning model #3 outputs the "speech response" when three error feature vectors are input to the learning model #3 is one. In this case, the probability of not outputting the "speech response" is 2/3. In this case, the learning model selection unit 150 selects the learning model having the smallest number of times for outputting the "speech response", i.e., the learning model #3 having the highest probability of not outputting the "speech response".

When a learning model in which the number of times of outputting the "speech response" is 0, i.e., a learning model having the probability of not outputting the "speech response" being 100% can be detected, the learning model selection unit 150 may terminate the process and omit the process for other learning models. Moreover, the learning model selection unit 150 may select any learning model in which the number of times of outputting the "speech response" is less than or equal to a predetermined threshold, i.e., any learning model having a probability of not outputting the "speech response" being more than or equal to the predetermined threshold.

As described so far, the voice interaction system 1 according to the first embodiment can reselect, when the response error of the speech collision occurs, the learning model which will not output the speech response for the feature vector of the user speech which induced the speech collision. By doing so, the voice interaction system 1 according to the first embodiment can effectively prevent a speech collision from occurring.

Figure 13:
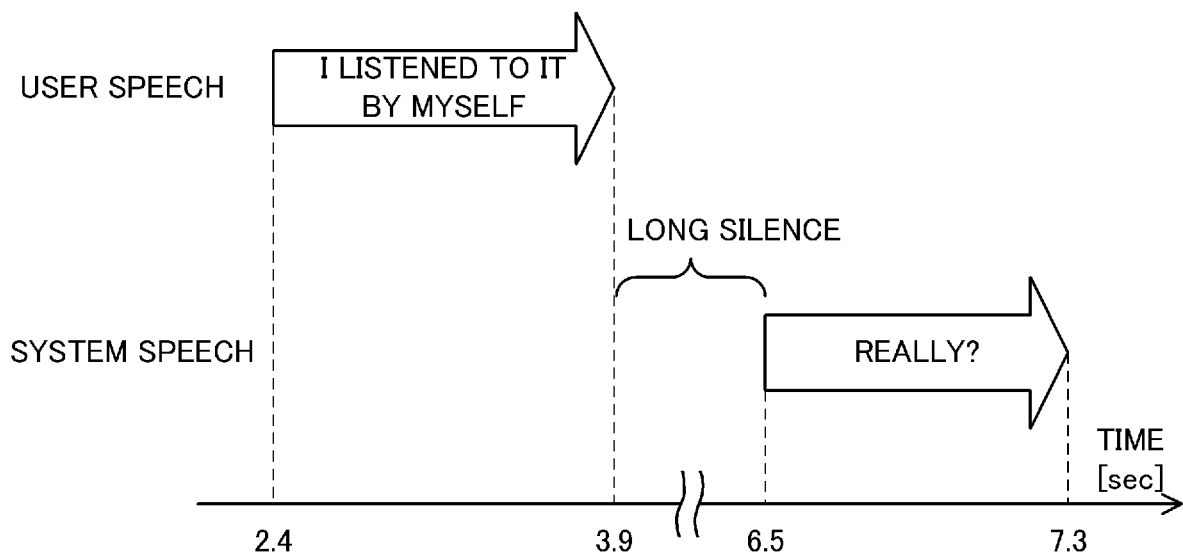
FIG. 13 shows an example of a long silence.

FIG. 13 shows an example of the long silence. In this example, suppose that there is a silence of more than Ts seconds (the second period) between the user speech and the system speech. Further, let Ts=2.5 (sec). In the example shown in FIG. 13, the user speech "I listened to it by myself" starts 2.4 seconds after the conversation has started and ends 3.9 seconds after the conversation has started. Further, the system speech "Really?" starts 6.5 seconds after the conversation has started and ends 7.3 seconds after the conversation has started. In this case, since a period from the end of the user speech "I listened to it by myself" until the start of the system speech "Really?" is 2.6 seconds, meaning that a silence has continued longer than Ts seconds, the response error determination unit 140 detects a "long silence".

Figure 14:
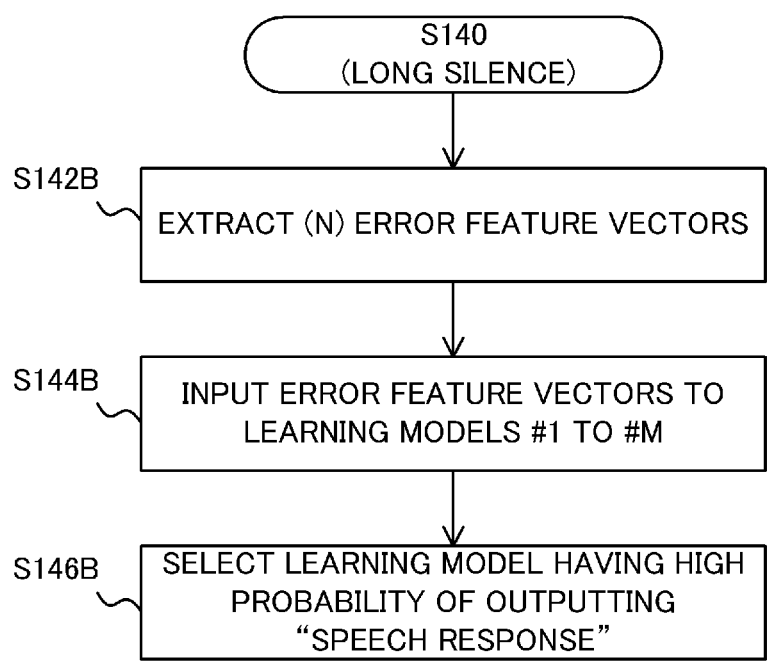
FIG. 14 is a flowchart showing processes of the learning model selection unit when the long silence occurs.

FIG. 14 is a flowchart showing processes (S140) of the learning model selection unit 150 when a long silence occurs. First, the learning model selection unit 150 extracts, from the feature storage unit 106, a feature vector (an error feature vector) corresponding to a response when a response error has occurred (Step S142B). In this case, at least N error feature vectors can be extracted. For example, in the example shown in FIG. 13, when the response determination unit 120 has determined to execute the silent response when feature extraction unit 104 extracts the feature vector of a part of the user speech "I listened to it by myself", the feature vector of the user speech "I listened to it by myself" is extracted.

Next, the learning model selection unit 150 inputs the error feature vectors extracted in the process of S142B to each of the learning models #1 to #M stored in the learning model database 160 (Step S144B). Then, the learning model selection unit 150 selects a learning model having a high probability of outputting the "speech response" (Step S146B).

For example, let N=3 and M=3. Further, suppose that a long silence occurs when the learning model #1 is used. In this case, the number of times the learning model #1 outputs the "speech response" when three error feature vectors are input to the learning model #1 is zero. In this case, the probability of outputting the "speech response" is 0/3. Further, suppose that the number of times the learning model #2 outputs the "speech response" when three error feature vectors are input to the learning model #2 is one. In this case, the probability of outputting the "speech response" is 1/3. Furthermore, suppose that the number of times the learning model #3 outputs the "speech response" when three error feature vectors are input to the learning model #3 is two. In this case, the probability of outputting the "speech response" is 2/3. In this case, the learning model selection unit 150 selects a learning model having the largest number of times of output the "speech response", i.e., the learning model #3 having the highest probability of outputting the "speech response".

When a learning model in which the number of times of not outputting the "speech response" is 0, i.e., a learning model having a probability of outputting the "speech response" being 100%, the learning model selection unit 150 may terminate the process and omit the process for other learning models. Moreover, the learning model selection unit 150 may select any learning model in which the number of times of not outputting the "speech response" is less than or equal to a predetermined threshold, i.e., any learning model having a probability of outputting the "speech response" being more than or equal to the predetermined threshold.

As described so far, the voice interaction system 1 according to the first embodiment can reselect, when the response error of the long silence occurs, the learning model which will output the speech response for the feature vector of the user speech which induced the long silence. By doing so, the voice interaction system 1 according to the first embodiment can effectively prevent a long silence from occurring.

Second Embodiment

Next, a second embodiment will be described. The second embodiment differs from the first embodiment in that a voice interaction system 1 according to the second embodiment generates a plurality of learning models. Note that a hardware configuration of the voice interaction system 1 according to the second embodiment is substantially the same as a hardware configuration of the voice interaction system 1 according to the first embodiment shown in FIG. 1, and thus the explanation of the voice interaction system 1 according to the second embodiment will be omitted.

Figure 15:
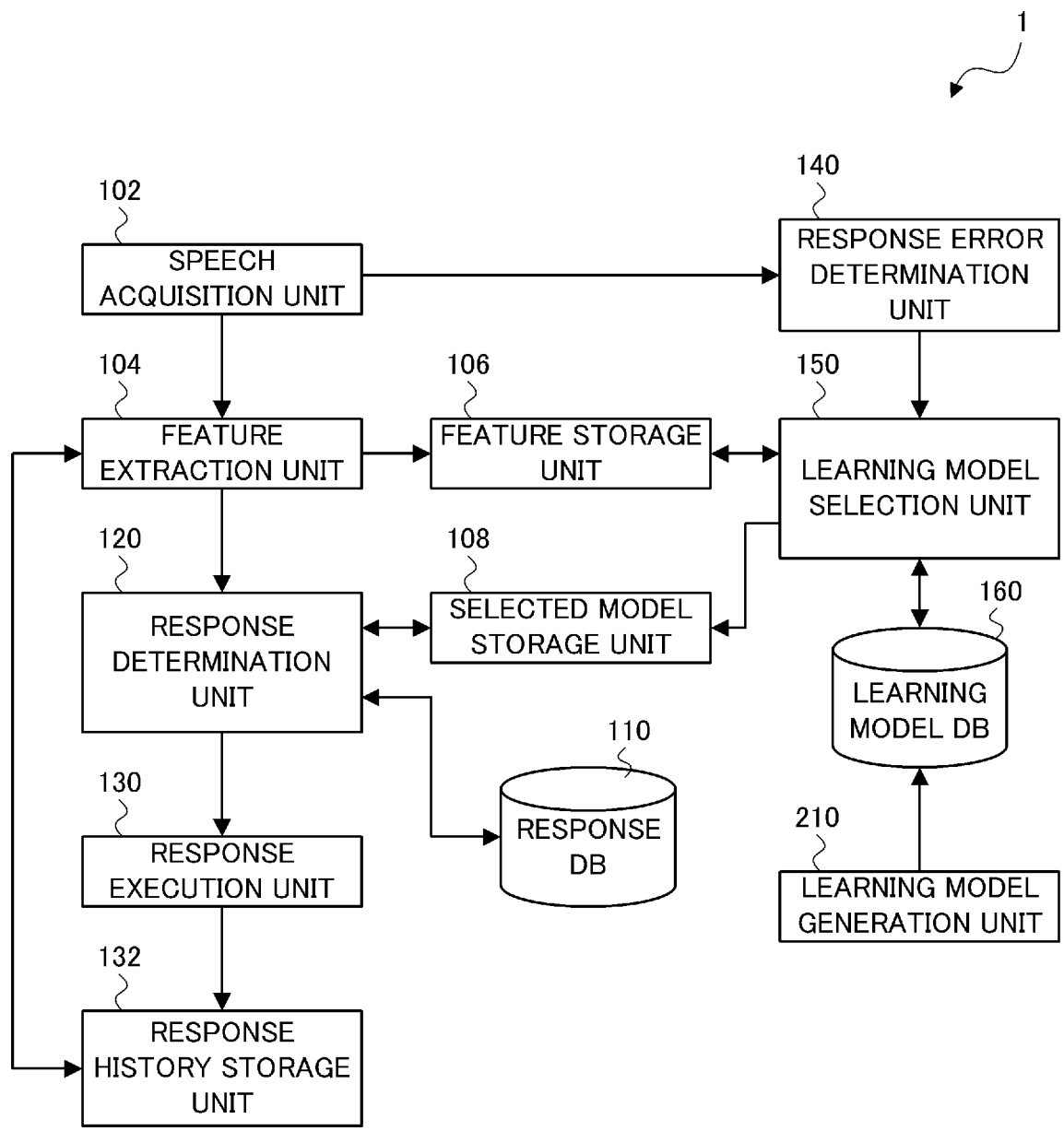
FIG. 15 is a block diagram showing a configuration of a voice interaction system according to a second embodiment.

FIG. 15 is a block diagram showing a configuration of the voice interaction system 1 according to the second embodiment. The voice interaction system 1 according to the second embodiment includes a speech acquisition unit 102, a feature extraction unit 104, a feature storage unit 106, a selected model storage unit 108, a response database 110, a response determination unit 120, a response execution unit 130, and a response history storage unit 132. The voice interaction system 1 according to the second embodiment further includes a response error determination unit 140, a learning model selection unit 150, a learning model database 160, and a learning model generation unit 210. Components other than the learning model generation unit 210 have substantially the same functions as those according to the first embodiment, and thus the explanation thereof is omitted.

Note that it is not necessarily that the learning model generation unit 210 is physically integrated with other components. That is, it is not necessary that the device (e.g., robot) including components other than the learning model generation unit 210 and the device (computer etc.) including the learning model generation unit 210 are the same. Specific functions of the learning model generation unit 210 are described below. Note that the processes of the learning model generation unit 210 (the processes of FIG. 16 described below) corresponds to FIGS. 4 to 6 and are performed in a stage prior to a conversation with a user (processes of FIG. 7).

Figure 16:
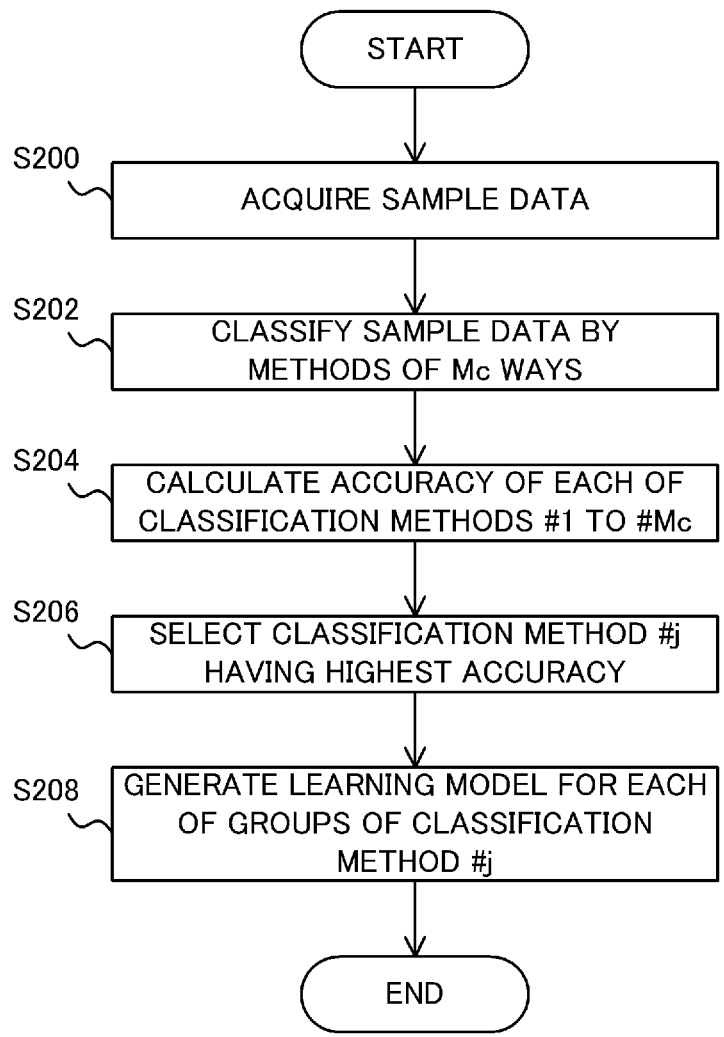
FIG. 16 is a flowchart showing processes performed by a learning model generation unit according to the second embodiment.

FIG. 16 is a flowchart showing processes of the learning model generation unit 210 according to the second embodiment. First, the learning model generation unit 210 acquires sample data necessary for generating a learning model (Step S200). In the second embodiment, a sample data group in which a feature vector and a correct label are associated with each other by an operator giving the correct label as shown in FIG. 4. An example of the sample data group is shown in FIG. 5.

FIG. 17 shows an example of the sample data group. Suppose that the sample data group shown in FIG. 17 includes sample data for 26 users A to Z. In each sample data, the feature vectors corresponding to user speech of the users A to Z are associated with the correct labels, respectively.

Next, the learning model generation unit 210 classifies the sample data by methods of Mc ways (Step S202). The classification method may be random, per user, or per topic when the sample data is generated. In the example shown below, the sample data is classified randomly per user. That is, suppose that a plurality of sample data pieces for a certain user are collectively classified (i.e., a plurality of sample data pieces for a certain user are not classified separately).

FIG. 18 shows an example in which the sample data pieces are classified. In the example shown in FIG. 18, the sample data pieces are classified by 10 classification methods (Mc=10). Thus, the sample data pieces shown in FIG. 17 are classified by different methods for each of classification methods #1 to #10. Further, in the method shown in FIG. 18, the sample data pieces are classified into two to five groups by each classification method. For example, the sample data pieces are classified into two groups by the classification method #1. The sample data pieces are classified into three groups by the classification method #10.

Next, the learning model generation unit 210 calculates accuracy of each of the classification methods #1 to #Mc (Step S204). Specifically, the learning model generation unit 210 calculates the accuracy of the learning model generated by each of the classification methods #1 to #Mc. More specifically, for each classification method, the learning model generation unit 210 applies k-fold Cross Validation to each group to generate a learning model for each group, and calculates the accuracy of these learning models. Then, the learning model generation unit 210 uses the average accuracy of the group as the accuracy of the classification method.

For example, the learning model generation unit 210 calculates the accuracy of the group #1 and the group #2 for the classification method #1 in the example shown in FIG. 18. At this time, the learning model generation unit 210 divides the sample data group of the group #1 into K subgroups. Then, the learning model generation unit 210 uses the sample data of one of the subgroups as test data and uses the sample data of the remaining K−1 subgroups as training data to generate a verification learning model by machine learning. The learning model generation unit 210 verifies the generated verification learning model with the sample data used as the test data. That is, the learning model generation unit 210 inputs the test data to the verification learning model and calculates a probability (matching level) of achieving a response which matches a correct label. The learning model generation unit 210 performs this process K times while changing the subgroup to be used as the test data. In this way, the learning model generation unit 210 calculates the accuracy (the probability of getting a correct label) of the group #1.

The learning model generation unit 210 performs the same processes for the group #2. Then, the learning model generation unit 210 calculates the accuracy of the classification method #1 by averaging the accuracy of the group #1 and the accuracy of the group #2. For example, if the accuracy of the group #1 is 68%, and the accuracy of group #2 is 70%, the accuracy of classification method #1 is 69%. The learning model generation unit 210 also performs similar processes for the other classification methods #2 to #10 to calculate the accuracy of each classification method.

Next, the learning model generation unit 210 selects the classification method #j with the highest accuracy (Step S206). The learning model generation unit 210 generates a learning model for each of the groups of the selected classification method #j (Step S208). For example, in the example shown in FIG. 18, when the accuracy of the classification method #10 is the highest at 75%, the learning model generation unit 210 selects the classification method #10. Then, the learning model generation unit 210 generates the learning model using each of the groups #1 to #3 of the classification method #10. That is, one learning model is generated using the sample data of the group #1, one learning model is generated using sample data of the group #2, and one learning model is generated using sample data of the group #3. Thus, in this example, three learning models are generated. The plurality of learning models are generated in this manner. In the second embodiment, it is possible to generate the plurality of learning models with high accuracy in advance by generating the learning models in this way. Therefore, when the learning model is reselected, it is possible to have a conversation with improved response accuracy.

Third Embodiment

Next, a third embodiment will be described. The third embodiment differs from the other embodiments in that, a voice interaction system 1 according to the third embodiment autonomously collects sample data. Note that a hardware configuration of the voice interaction system 1 according to the third embodiment is substantially the same as a configuration of the voice interaction system 1 according to the first embodiment shown in FIG. 1, and thus the explanation thereof will be omitted. In the first and second embodiments, as shown in FIG. 4, the correct label is given to the feature vector by the operator's operation. However, in the third embodiment, the voice interaction system 1 autonomously gives a correct label to a feature vector of user speech. Here, in the third embodiment, the voice interaction system 1 can autonomously collect sample data using the components elements shown in FIG. 2. However, a system (an autonomous robot) different from the voice interaction system 1 may autonomously collect sample data.

Figure 19:
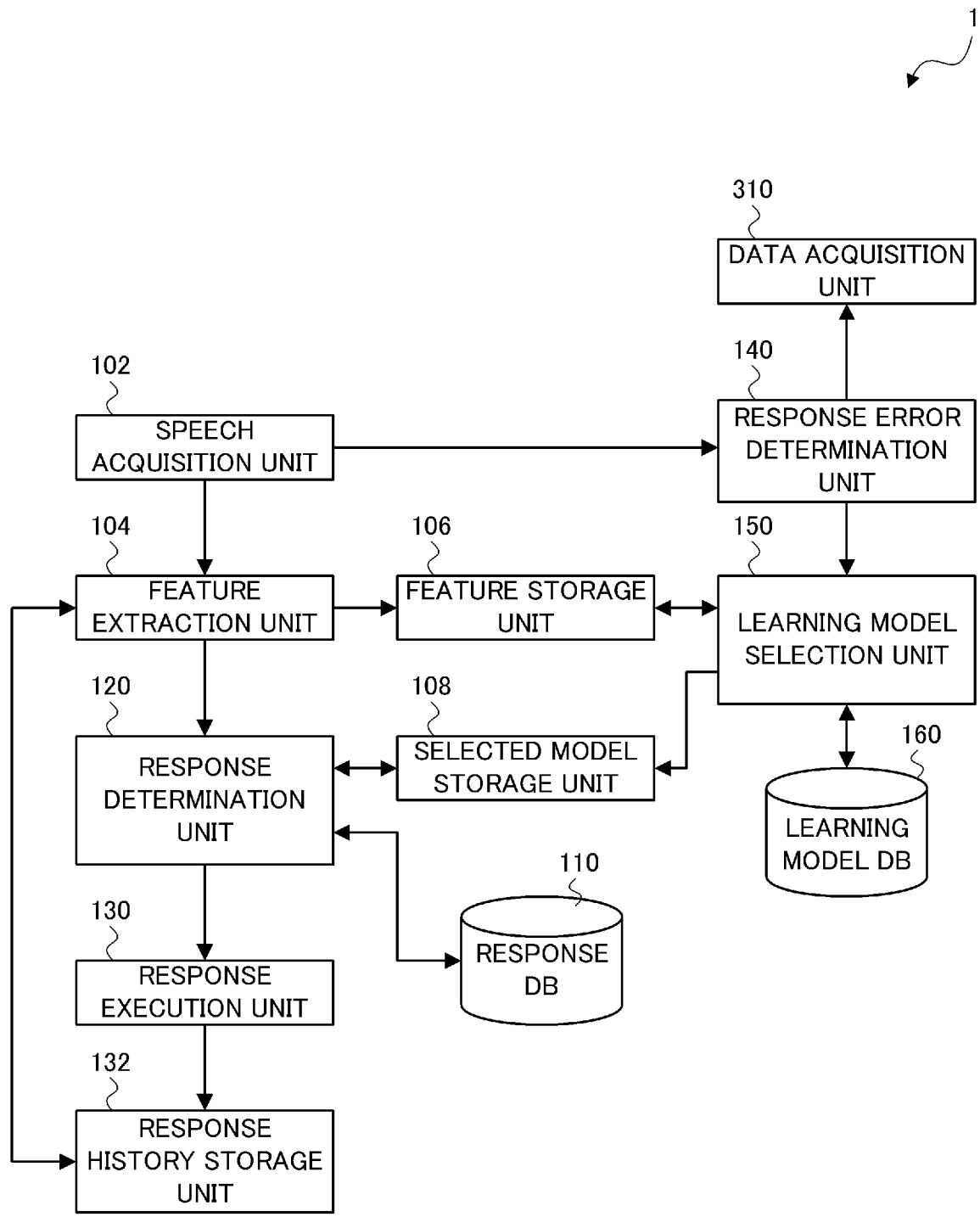
FIG. 19 is a block diagram showing a configuration of a voice interaction system according to a third embodiment.

FIG. 19 is a block diagram showing a configuration of the voice interaction system 1 according to the third embodiment. The voice interaction system 1 according to the third embodiment includes a speech acquisition unit 102, a feature extraction unit 104, a feature storage unit 106, a selected model storage unit 108, a response database 110, a response determination unit 120, a response execution unit 130, and a response history storage unit 132. The voice interaction system 1 according to the third embodiment further includes a response error determination unit 140, a learning model selection unit 150, a learning model database 160, and a data acquisition unit 310. Components other than the data acquisition unit 310 have substantially the same functions as those according to the first embodiment, and thus the explanation thereof is omitted.

Figure 20:
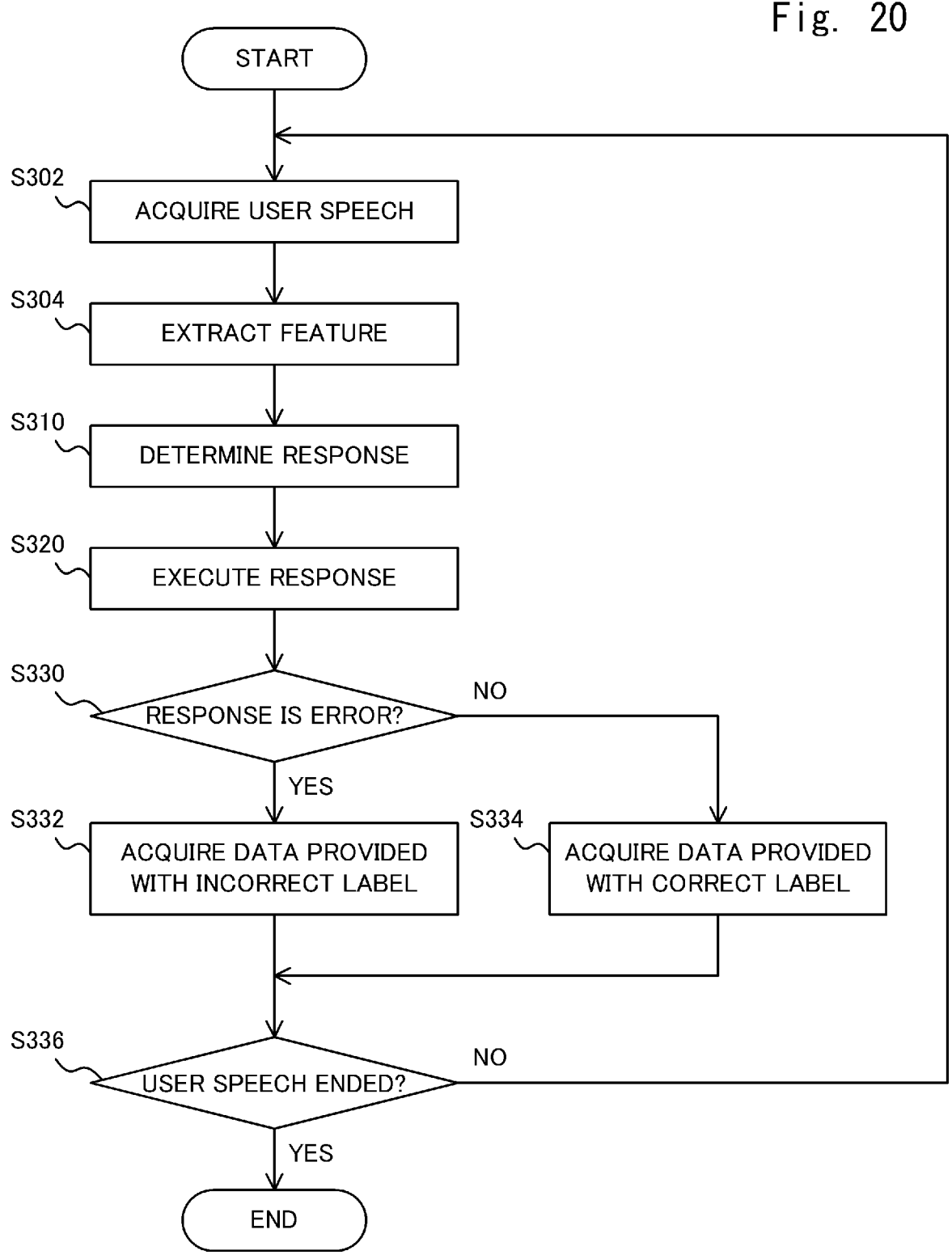
FIG. 20 is a flowchart showing a method of acquiring sample data performed by the voice interaction system according to the third embodiment.

FIG. 20 is a flowchart showing a method of acquiring sample data performed by the voice interaction system 1 according to the third embodiment. First, the speech acquisition unit 102 acquires user speech in the same manner as the process of S102 in FIG. 7 (Step S302). The feature extraction unit 104 extracts a feature (a feature vector) of acquired user speech in the same manner as the process of S104 in FIG. 7 (Step S304).

Next, in a manner similar to the process of S110 in FIG. 7, the response determination unit 120 determines a response corresponding to the extracted feature vector using a certain determination model (Step S310). Note that the determination model used in S310 may be a learning model generated in advance by machine learning or the like, and it may not be stored in the learning model database 160. For example, the response execution unit 130 executes the response determined in S310 in the same manner as the process in S120 in FIG. 7 (Step S320).

In the same manner as the process of S130 of FIG. 7, the response error determination unit 140 determines whether the response has been an error (Step S330). When it is determined that the response has been an error (YES in S330), the data acquisition unit 310 acquires the sample data in which an incorrect label is given to the feature vector (Step S332). On the other hand, when it is determined that the response has not been an error (NO in S330), the data acquisition unit 310 acquires sample data in which a correct label is given to the feature vector (Step S334). When the user speech has not ended (NO in Step S336), the process returns to Step S302.

Figure 21:
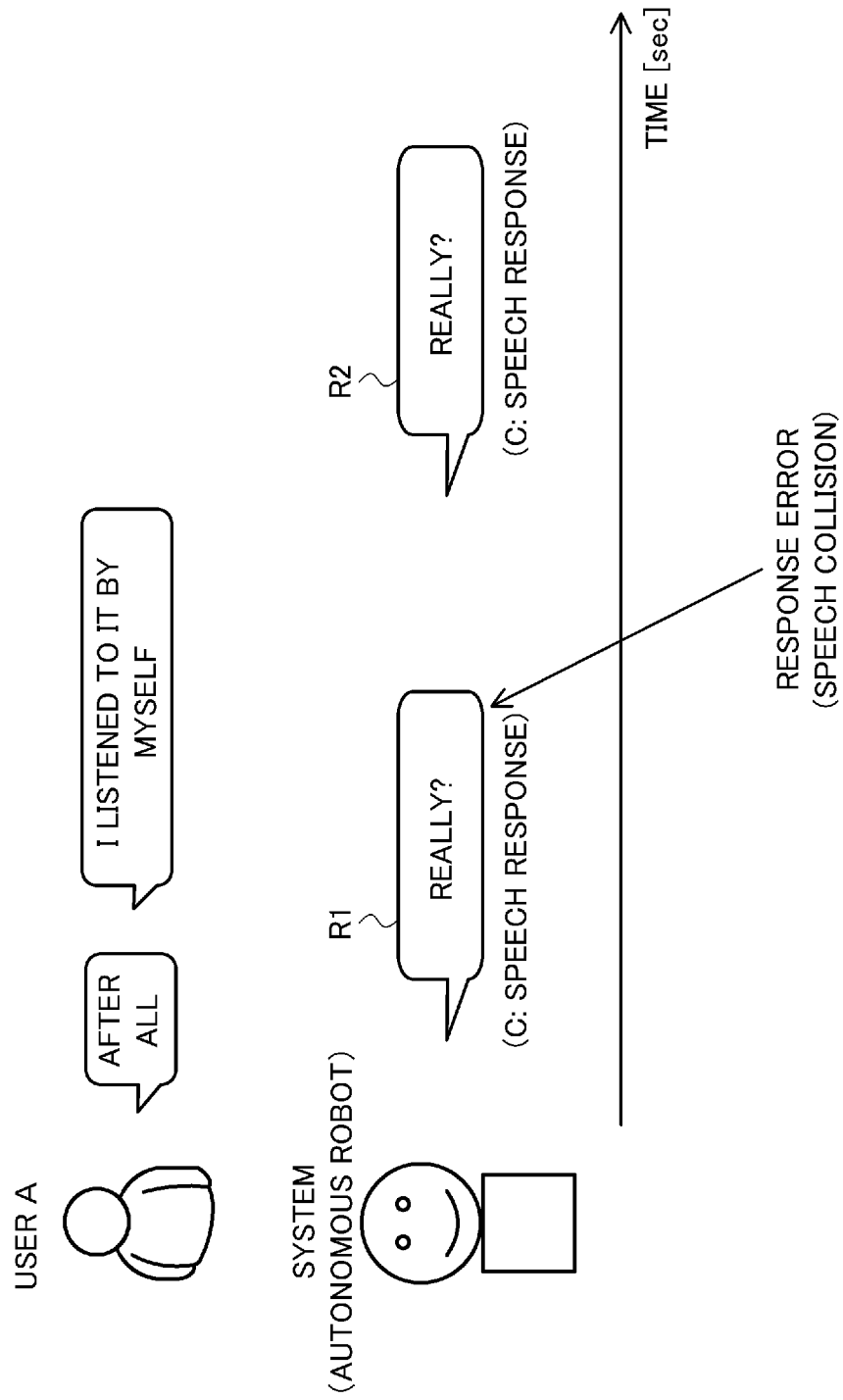
FIG. 21 is a diagram for explaining a method of acquiring sample data performed by the voice interaction system according to the third embodiment.

FIG. 21 is a diagram for explaining a method of acquiring the sample data performed by the voice interaction system 1 according to the third embodiment. The voice interaction system 1 outputs system speech R1 "Really?", which is a speech response, in response to user speech "after all" using some determination model. Then, the response error determination unit 140 of the voice interaction system 1 determines that the system speech R1 is a response error (a speech collision) (YES in S330). Accordingly, the data acquisition unit 310 acquires the sample data in which an incorrect label is given to the feature vector of the user speech "after all" (S332). Moreover, the voice interaction system 1 outputs system speech R2 "Really?" which is a speech response, in response to the user speech "I listened to it by myself" using some determination model. Then, the response error determination unit 140 of the voice interaction system 1 determines that the system speech R1 is not a response error (NO in S330). Thus, the data acquisition unit 310 acquires the sample data in which a correct label is given to the feature vector of the user speech "I listened to it by myself" (S334).

FIGS. 22 and 23 show examples of the sample data used in the generation of the learning model (FIGS. 6 and 16) according to the third embodiment. In the sample data group shown in FIG. 22, the sample data for the user speech "after all" in which an incorrect label is given is excluded. In the sample data group shown in FIG. 23, an incorrect label "not C" is given to the sample data for the user speech "after all". In the third embodiment, machine learning is executed using the sample data group shown in FIG. 22 or the sample data group shown in FIG. 23 to generate a learning model.

In the manner described so far, the voice interaction system 1 according to the third embodiment can autonomously acquire the sample data. Thus, the sample data can be acquired without requiring the operator's operation. Furthermore, when the sample data is acquired autonomously using the learning model stored in the learning model database 160, it is possible to perform online learning for the learning model, so that the learning model can be updated.

Therefore, the voice interaction system 1 according to the third embodiment can efficiently generate a learning model.

Modified Example

Note that the present disclosure is not limited to the above-described embodiments, and various modifications can be made without departing from the spirit and scope of the present disclosure. For example, the order of a plurality of processes in the above-described flowcharts can be changed as appropriate. Further, at least one of the plurality of processes in the above-described flowcharts may be omitted.

Further, the above-described embodiments can be mutually applied. For example, the third embodiment can also be applied to the second embodiment. That is, the voice interaction system 1 may include the learning model generation unit 210 and the data acquisition unit 310, and the learning model generation unit 210 may generate a learning model using the sample data acquired by the data acquisition unit 310.

In the process of S134 in FIG. 7, it is not necessary that N response errors are of the same type. That is, in the process of S134, it may be determined whether the sum of the number of the "speech collisions" and the number of the "long silences" have reached N times or more. For example, if N=3, when the "speech collision" is detected twice, and the "long silence" is detected once, a learning model may be selected in the process of S140. In this case, the learning model selection unit 150 performs processes combining the processes of FIG. 12 and the processes of FIG. 14. Specifically, the learning model selection unit 150 selects a learning model having a high probability of not outputting the "speech response" when the feature vector corresponding to the response which has become the "speech collision" is input and outputting the "speech response" when the feature vector corresponding to the response which has become the "long silence" is input.

For example, when N=3 and M=3, and the "speech collision" is detected twice, and the "long silence" is detected once. Further suppose that the speech collision occurs when the learning model #1 is used. In this example, it is assumed that the number of times that the learning model #2 has not output the "speech response" when an error feature vector related to the two "speech collisions" is input to the learning model #2 is one. Suppose that the number of times the learning model #2 outputs the "speech response" when an error feature vector related to one "long silence" is input to the learning model #2 is one. In this case, the probability of not outputting a response that has become a response error for the learning model #2 is 2/3. Further, suppose that the number of times the learning model #3 has not output the "speech response" when an error feature vector related to two "speech collisions" is input to the learning model #3 is zero. Further suppose that the number of times the learning model #3 outputs the "speech response" when an error feature vector related to one "long silence" is input to the learning model #3 is one. In this case, the probability of not outputting a response that has become a response error for the learning model #3 is 1/3. In such a case, the learning model selection unit 150 selects the learning model #2 having the lowest number of times of outputting the response which has become a response error, i.e., the learning model #2 having the highest probability of not outputting the response which has become a response error.

In the above-described embodiments, the response to the user speech is determined only from the non-linguistic information. However, the configuration is not limited to such a configuration. The semantic content of the user speech may be recognized using a syntactic analysis which uses linguistic information of the user speech, and then the system speech corresponding to the semantic content may be executed. However, as described above, since the time required for the syntactic analysis is longer than the time required for analyzing the non-linguistic information, more real-time conversations can be achieved when only the analysis on the non-linguistic information is used.

Moreover, in the above-described embodiments, examples in which the voice interaction system 1 is installed in the robot are shown. However, the configuration is not limited to such a configuration. The voice interaction system 1 can also be installed in an information terminal such as a smartphone or a tablet terminal. In this case, when a "nod response" is performed, a moving image such as a nodding person, animal, robot, or the like may be displayed on a display screen of the information terminal instead of operating the manipulator 8.

In the above examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A voice interaction system configured to have a conversation with a user by using a voice, comprising:
   hardware, including at least one memory configured to store a computer program and at least one processor configured to execute the computer program;
   a speech acquisition unit, implemented by the hardware, configured to acquire user speech, the user speech being speech given by the user;
   a feature extraction unit configured to extract a feature of the acquired user speech;
   a response determination unit, implemented by the hardware, configured to determine a response corresponding to the extracted feature using any one of a plurality of learning models generated in advance by machine learning;
   a response execution unit configured to perform control in order to execute the determined response;
   a response error determination unit, implemented by the hardware, configured to determine whether the executed response is an error according to a timing of the executed response to the user speech or a timing of the user speech for the executed response; and a learning model selection unit, implemented by the hardware, configured to select the learning model from the plurality of learning models according to a result of the determination by the response error determination unit, wherein when the response has been determined to be the error more than or equal to a predetermined plurality of times within a predetermined first period, the learning model selection unit selects the learning model having a high probability of not selecting the response determined to be the error when the feature, corresponding to the response determined to be the error, has been input, and the response determination unit determines the response using the learning model selected by the learning model selection unit.

2. The voice interaction system according to claim 1, wherein when a speech response is executed by the response execution unit during the user speech or when the user speech is executed while the response execution unit is executing the speech response, the response error determination unit determines that the response is an error of a speech collision, and the learning model selection unit selects the learning model having a high probability of not outputting the speech response when the feature, corresponding to the response when the response has been determined to be the error of the speech collision, has been input.

3. The voice interaction system according to claim 1, wherein when a period from an end of the user speech until execution of the speech response by the response execution unit is longer than or equal to a predetermined second period, the response error determination unit determines the response as an error of a long silence, and the learning model selection unit selects the learning model having a high probability of outputting the speech response when the feature, corresponding to the response when the response has been determined to be the error of the long silence, has been input.

4. The voice interaction system according to claim 1, further comprising a learning model generation unit, implemented by the hardware, configured to generate a plurality of learning models, wherein the learning model generation unit classifies a sample data group used for the generating the learning model by a plurality of classification methods, calculates accuracy of each of the plurality of classification methods by calculating accuracy of each of the plurality of learning models obtained by performing machine learning for each of a plurality of groups obtained after the sample data group is classified, and generates the plurality of learning models using each of the plurality of groups classified by a classification method having the highest accuracy.

5. The voice interaction system according to claim 1, further comprising a data acquisition unit, implemented by the hardware, configured to acquire sample data for generating the learning model, wherein when the data acquisition unit acquires the sample data,
the speech acquisition unit acquires the user speech for acquiring the sample data,
the feature extraction unit extracts the feature of the acquired user speech,
the response determination unit determines the response according to the extracted feature using a determination model generated in advance by machine learning,
the response execution unit performs control for executing the determined response,
the response error determination unit determines whether the executed response to the user speech for acquiring the sample data is the error, and
when the executed response to the user speech for acquiring the sample data is the error, the data acquisition unit acquires the sample data by giving an incorrect label to the feature corresponding to the user speech.

6. A voice interaction method performed by a voice interaction system that has a conversation with a user by using a voice, the voice interaction method comprising:

acquiring user speech given by the user;
extracting a feature of the acquired user speech;
determining a response corresponding to the extracted feature using any one of a plurality of learning models generated in advance by machine learning;
performing control in order to execute the determined response;
determining whether the executed response is an error according to a timing of the executed response to the user speech or a timing of the user speech for the executed response; and
when the response has been determined to be the error more than or equal to a predetermined plurality of times within a predetermined first period, selecting the learning model having a high probability of not selecting the response determined to be the error when the feature, corresponding to the response determined to be the error, has been input, from the plurality of learning models, wherein
the response is determined using the selected learning model.

7. A non-transitory computer readable medium storing a program for executing a voice interaction method performed by a voice interaction system that has a conversation with a user by using a voice, the program causing a computer to execute:

acquiring user speech given by the user;
extracting a feature of the acquired user speech;
determining a response corresponding to the extracted feature using any one of a plurality of learning models generated in advance by machine learning;
performing control in order to execute the determined response;
determining whether the executed response is an error according to a timing of the executed response to the user speech or a timing of the user speech for the executed response; and
when the response has been determined to be the error more than or equal to a predetermined plurality of times within a predetermined first period, selecting the learning model having a high probability of not selecting the response determined to be the error when the feature, corresponding to the response determined to be the error, has been input, from the plurality of learning models, wherein
the response is determined using the selected learning model.

\* \* \* \* \*